(12) United States Patent
Karabinis

(10) Patent No.: US 7,603,081 B2
(45) Date of Patent: Oct. 13, 2009

(54) RADIOTELEPHONES AND OPERATING METHODS THAT USE A SINGLE RADIO FREQUENCY CHAIN AND A SINGLE BASEBAND PROCESSOR FOR SPACE-BASED AND TERRESTRIAL COMMUNICATIONS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 571 days.

(21) Appl. No.: 11/142,119

(22) Filed: Jun. 1, 2005

(65) Prior Publication Data
US 2005/0245192 A1 Nov. 3, 2005

Related U.S. Application Data

(63) Continuation-in-part of application No. 10/225,613, filed on Aug. 22, 2002, now Pat. No. 7,181,161, and a continuation-in-part of application No. 10/074,097, filed on Feb. 12, 2002, now Pat. No. 6,684,057.

(60) Provisional application No. 60/383,690, filed on May 28, 2002, provisional application No. 60/388,087, filed on Jun. 12, 2002, provisional application No. 60/322,240, filed on Sep. 14, 2001.

(51) Int. Cl.
*H04Q 7/20* (2006.01)
(52) U.S. Cl. ............... 455/12.1; 342/392; 343/832; 370/316
(58) Field of Classification Search ............ 455/12.1
See application file for complete search history.

(56) References Cited

U.S. PATENT DOCUMENTS 4,873,683 A * 10/1989 Borth et al. ............ 370/337
4,901,307 A 2/1990 Gilhousen et al.
5,073,900 A 12/1991 Mallinckrodt
5,303,286 A 4/1994 Wiedeman (Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Duc Nguyen
*Assistant Examiner*—Hai V Nguyen
(74) *Attorney, Agent, or Firm*—Myers Bigel Sibley & Sajovec, P.A.

(57) ABSTRACT

A radiotelephone includes a single radio frequency chain and a single baseband processor that is connected thereto. The single radio frequency chain and the single baseband processor are configured to communicate with a space-based system using frequencies of a satellite band and an air interface, and to communicate with a terrestrial wireless network using frequencies of the satellite band and substantially the air interface.

29 Claims, 14 Drawing Sheets

U.S. PATENT DOCUMENTS

| | | | |
|---|---|---|---|
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,564,076 A * | 10/1996 | Auvray | 455/76 |
| 5,584,046 A | 12/1996 | Martinez et al. | |
| 5,596,570 A * | 1/1997 | Soliman | 370/252 |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,805,241 A * | 9/1998 | Limberg | 348/725 |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A * | 3/1999 | Wiedeman et al. | 455/12.1 |
| 5,903,549 A * | 5/1999 | von der Embse et al. | 370/310 |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A * | 4/2000 | Karabinis | 455/427 |
| 6,067,442 A | 5/2000 | Wiedeman et al. | |
| 6,072,430 A | 6/2000 | Wyrwas et al. | |
| 6,085,090 A * | 7/2000 | Yee et al. | 455/440 |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,128,276 A * | 10/2000 | Agee | 370/208 |
| 6,134,437 A | 10/2000 | Karabinis et al. | |
| 6,138,010 A * | 10/2000 | Rabe et al. | 455/426.1 |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,208,627 B1 * | 3/2001 | Menon et al. | 370/328 |
| 6,233,463 B1 | 5/2001 | Wiedeman et al. | |
| 6,240,124 B1 | 5/2001 | Wiedeman et al. | |
| 6,243,589 B1 * | 6/2001 | Novel | 455/466 |
| 6,253,080 B1 * | 6/2001 | Wiedeman et al. | 455/428 |
| 6,256,497 B1 | 7/2001 | Chambers | |
| 6,324,405 B1 | 11/2001 | Young et al. | |
| 6,339,611 B1 * | 1/2002 | Antonio et al. | 375/130 |
| 6,339,707 B1 | 1/2002 | Wainfan et al. | |
| 6,400,961 B1 * | 6/2002 | Lillie et al. | 455/552.1 |
| 6,418,147 B1 | 7/2002 | Wiedeman | |
| 6,421,371 B1 * | 7/2002 | Sourour et al. | 375/142 |
| 6,449,461 B1 | 9/2002 | Otten | |
| 6,449,499 B1 * | 9/2002 | Ishikura et al. | 455/571 |
| 6,459,905 B1 * | 10/2002 | Fuji | 455/552.1 |
| 6,510,317 B1 * | 1/2003 | Marko et al. | 455/428 |
| 6,522,865 B1 | 2/2003 | Otten | |
| 6,532,370 B1 * | 3/2003 | Underbrink et al. | 455/552.1 |
| 6,539,068 B2 * | 3/2003 | Hebron et al. | 375/346 |
| 6,580,921 B1 * | 6/2003 | Inoue et al. | 455/552.1 |
| 6,615,024 B1 * | 9/2003 | Boros et al. | 455/67.14 |
| 6,628,919 B1 | 9/2003 | Curello et al. | |
| 6,654,590 B2 * | 11/2003 | Boros et al. | 455/67.14 |
| 6,658,237 B1 * | 12/2003 | Rozenblit et al. | 455/83 |
| 6,668,161 B2 * | 12/2003 | Boros et al. | 455/67.14 |
| 6,684,057 B2 | 1/2004 | Karabinis | |
| 6,697,415 B1 * | 2/2004 | Mahany | 375/130 |
| 6,714,760 B2 * | 3/2004 | Robinett | 455/3.02 |
| 6,725,053 B2 * | 4/2004 | Rosen et al. | 455/518 |
| 6,735,437 B2 * | 5/2004 | Mayfield et al. | 455/427 |
| 6,735,440 B2 * | 5/2004 | Wiedeman et al. | 455/429 |
| 6,751,205 B2 * | 6/2004 | Menon et al. | 370/328 |
| 6,775,251 B1 | 8/2004 | Wiedeman | |
| 6,785,543 B2 | 8/2004 | Karabinis | |
| 6,804,558 B2 * | 10/2004 | Haller et al. | 607/30 |
| 6,816,782 B1 * | 11/2004 | Walters et al. | 701/209 |
| 6,823,170 B1 | 11/2004 | Dent | 455/13.3 |
| 6,823,196 B1 * | 11/2004 | Itoh et al. | 455/553.1 |
| 6,836,515 B1 * | 12/2004 | Kay et al. | 375/260 |
| 6,856,787 B2 | 2/2005 | Karabinis | |
| 6,859,652 B2 * | 2/2005 | Karabinis et al. | 455/427 |
| 6,879,829 B2 | 4/2005 | Dutta et al. | |
| 6,892,068 B2 * | 5/2005 | Karabinis et al. | 455/429 |
| 6,904,110 B2 * | 6/2005 | Trans et al. | 375/350 |
| 6,917,337 B2 * | 7/2005 | Iida et al. | 343/702 |
| 6,933,876 B1 * | 8/2005 | Underbrink et al. | 341/162 |
| 6,937,857 B2 | 8/2005 | Karabinis | |
| 6,950,625 B2 * | 9/2005 | Regulinski et al. | 455/13.1 |
| 6,963,742 B2 * | 11/2005 | Boros et al. | 455/424 |
| 6,968,017 B2 * | 11/2005 | Nielsen | 375/316 |
| 6,975,837 B1 | 12/2005 | Santoru | |
| 6,985,454 B1 * | 1/2006 | Wiedeman et al. | 370/316 |
| 6,990,093 B1 * | 1/2006 | Rantalainen et al. | 370/350 |
| 6,999,720 B2 | 2/2006 | Karabinis | |
| 7,006,789 B2 | 2/2006 | Karabinis et al. | |
| 7,016,646 B2 * | 3/2006 | Mayfield et al. | 455/12.1 |
| 7,035,648 B2 * | 4/2006 | Czaja et al. | 455/456.1 |
| 7,043,210 B2 * | 5/2006 | Zhu et al. | 455/102 |
| 7,072,380 B2 * | 7/2006 | Ozluturk et al. | 375/141 |
| 7,092,676 B2 * | 8/2006 | Abdelgany et al. | 455/76 |
| 7,149,773 B2 * | 12/2006 | Haller et al. | 709/203 |
| 7,155,161 B2 * | 12/2006 | Regulinski et al. | 455/13.1 |
| 7,170,924 B2 * | 1/2007 | Corbaton et al. | 375/148 |
| 7,181,237 B2 * | 2/2007 | Stockhusen | 455/552.1 |
| 7,181,505 B2 * | 2/2007 | Haller et al. | 709/219 |
| 7,272,413 B2 * | 9/2007 | Yu | 455/552.1 |
| 7,305,211 B2 * | 12/2007 | Dent | 455/12.1 |
| 7,346,134 B2 * | 3/2008 | Smith | 375/346 |
| 7,535,874 B2 * | 5/2009 | Ozluturk et al. | 370/335 |
| 2001/0005840 A1 | 6/2001 | Verkama | 705/67 |
| 2001/0026537 A1 * | 10/2001 | Massey | 370/316 |
| 2001/0051787 A1 | 12/2001 | Haller et al. | 604/66 |
| 2002/0013613 A1 * | 1/2002 | Haller et al. | 607/60 |
| 2002/0039900 A1 * | 4/2002 | Wiedeman et al. | 455/428 |
| 2002/0052539 A1 * | 5/2002 | Haller et al. | 600/300 |
| 2002/0082665 A1 * | 6/2002 | Haller et al. | 607/60 |
| 2002/0098802 A1 * | 7/2002 | Karabinis | 455/13.1 |
| 2002/0122408 A1 | 9/2002 | Mullins | |
| 2002/0137517 A1 * | 9/2002 | Williams et al. | 455/444 |
| 2002/0146979 A1 * | 10/2002 | Regulinski et al. | 455/13.1 |
| 2002/0155818 A1 * | 10/2002 | Boros et al. | 455/67.4 |
| 2002/0177465 A1 * | 11/2002 | Robinett | 455/552 |
| 2002/0193108 A1 * | 12/2002 | Robinett | 455/427 |
| 2003/0003815 A1 | 1/2003 | Yamada | |
| 2003/0016770 A1 * | 1/2003 | Trans et al. | 375/346 |
| 2003/0021367 A1 * | 1/2003 | Smith | 375/346 |
| 2003/0022625 A1 | 1/2003 | Otten et al. | |
| 2003/0032423 A1 * | 2/2003 | Boros et al. | 455/423 |
| 2003/0040337 A1 * | 2/2003 | Ylitalo | 455/562 |
| 2003/0050016 A1 * | 3/2003 | Boros et al. | 455/67.4 |
| 2003/0054761 A1 | 3/2003 | Karabinis | |
| 2003/0054762 A1 | 3/2003 | Karabinis | |
| 2003/0054814 A1 | 3/2003 | Karabinis et al. | |

| | | |
|---|---|---|
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0078037 A1* | 4/2003 | Auckland et al. ............ 455/422 |
| 2003/0086515 A1* | 5/2003 | Trans et al. ................. 375/346 |
| 2003/0149986 A1 | 8/2003 | Mayfield et al. |
| 2003/0153308 A1 | 8/2003 | Karabinis |
| 2003/0224785 A1 | 12/2003 | Karabinis |
| 2004/0072539 A1 | 4/2004 | Monte et al. |
| 2004/0102156 A1 | 5/2004 | Loner |
| 2004/0105403 A1* | 6/2004 | Lin et al. .................... 370/316 |
| 2004/0121727 A1 | 6/2004 | Karabinis |
| 2004/0127260 A1* | 7/2004 | Boros et al. .............. 455/562.1 |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0201779 A1* | 10/2004 | Spilker, Jr. .................. 348/510 |
| 2004/0203393 A1 | 10/2004 | Chen |
| 2004/0203742 A1 | 10/2004 | Karabinis |
| 2004/0240525 A1 | 12/2004 | Karabinis et al. |
| 2004/0259497 A1* | 12/2004 | Dent ......................... 455/13.3 |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0094604 A1* | 5/2005 | Ozluturk et al. ............. 370/335 |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0186933 A1* | 8/2005 | Trans ......................... 455/296 |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0245228 A1* | 11/2005 | Candal et al. ................ 455/347 |
| 2005/0260947 A1 | 11/2005 | Karabinis et al. |
| 2005/0260948 A1* | 11/2005 | Regulinski et al. ......... 455/12.1 |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0038719 A1* | 2/2006 | Pande et al. ............ 342/357.12 |
| 2006/0072520 A1* | 4/2006 | Chitrapu et al. ............. 370/337 |
| 2007/0077884 A1* | 4/2007 | Regulinski et al. ......... 455/12.1 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 99/10994 A1 | 3/1999 |
| WO | WO 00/22753 A2 | 4/2000 |
| WO | WO 01/54314 A1 | 7/2001 |
| WO | WO 03/065617 A1 | 8/2003 |
| WO | WO 2005/101692 A1 | 10/2005 |

OTHER PUBLICATIONS

Ayyagari et al., "A satellite-augmented cellular network concept", *Wireless Networks*, Vo. 4, 1998, pp. 189-198.

International Search Report, PCT/US02/26847, Apr. 3, 2003.

Notification of Transmittal of the International Search Report and the Written Opinion of the International Searching Authority, or the Declaration, International and Written Opinion of the International Searching Authority, PCT/US2006/041556, Apr. 2, 2007.

Supplementary European Search Report, EP 02763505.1, Oct. 24, 2007.

European Search Report, EP 08 00 6235, Sep. 3, 2008.

* cited by examiner

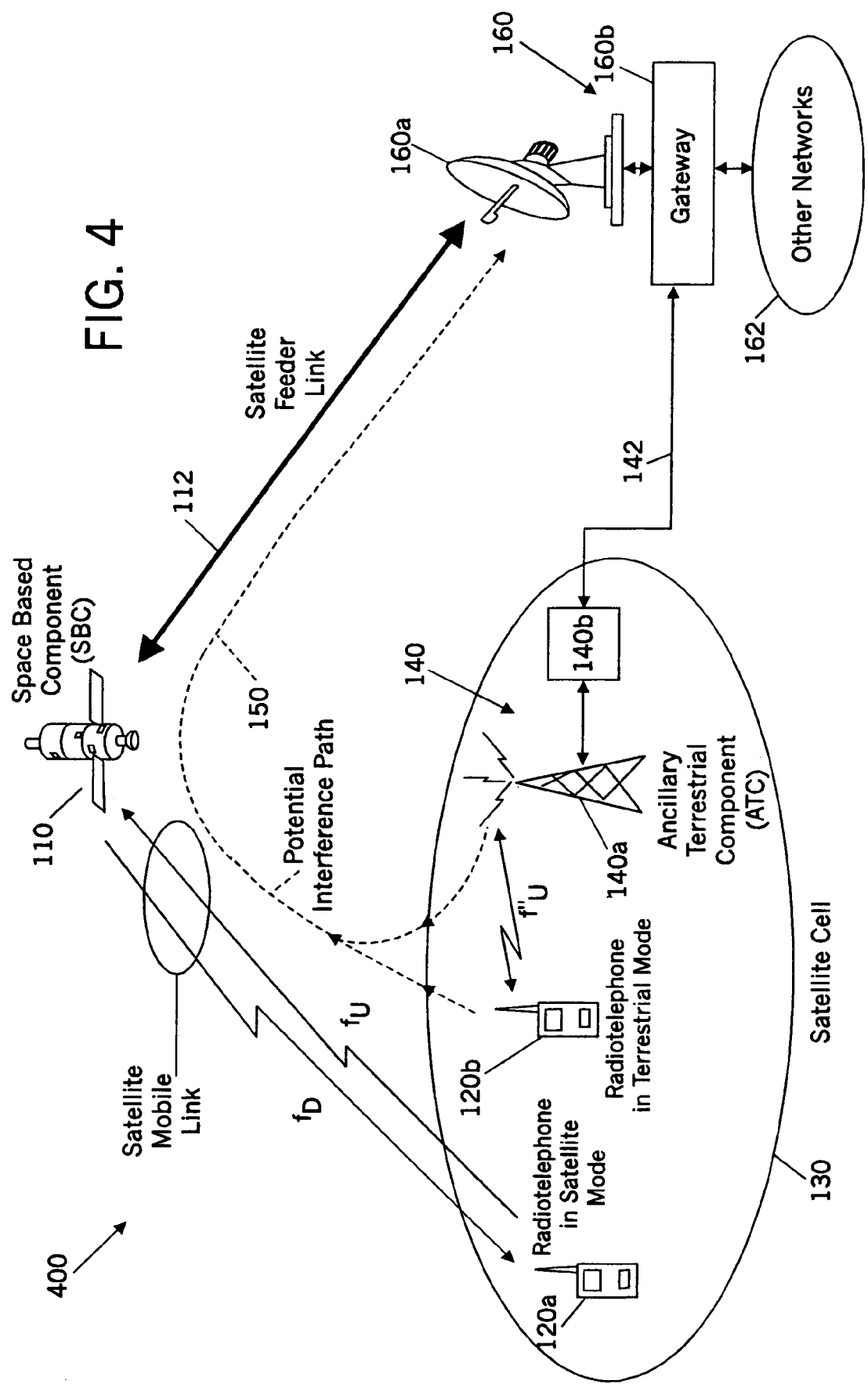

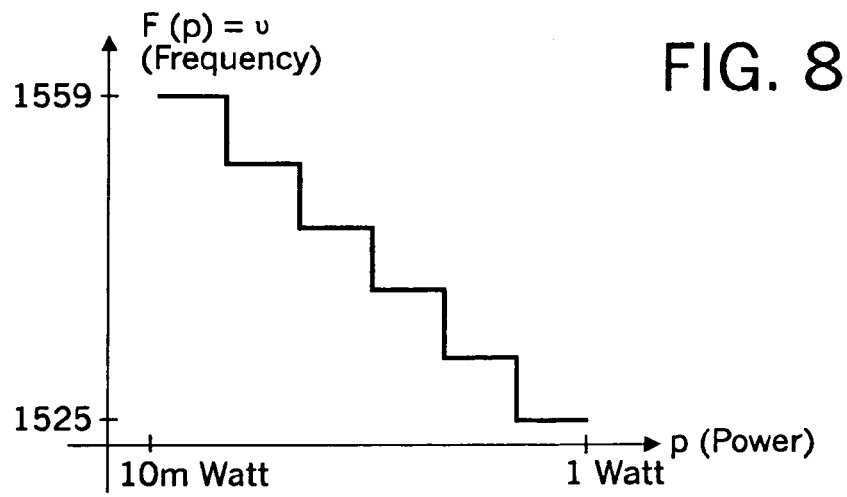
FIG. 8
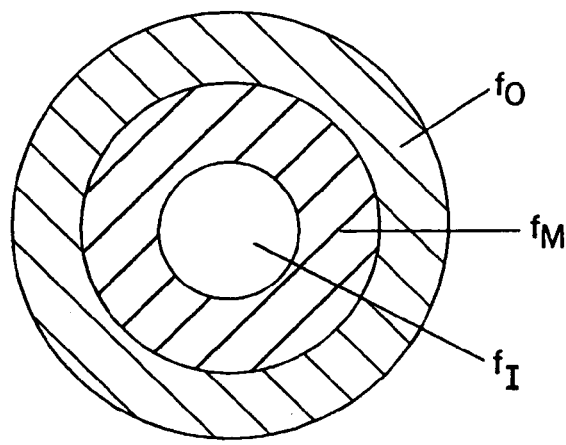
FIG. 9
FIG. 10
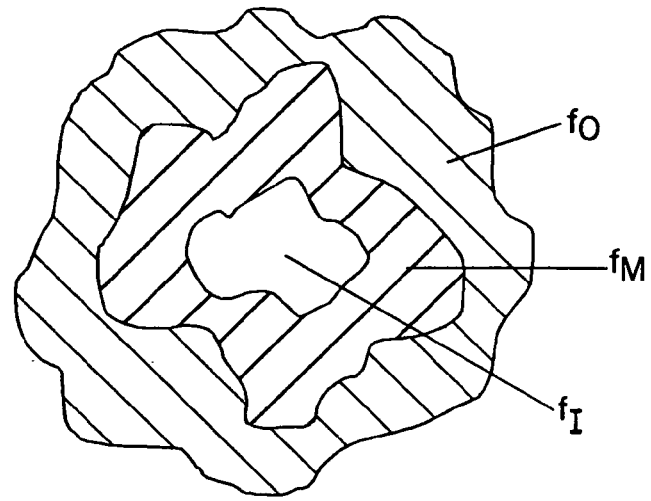

RADIOTELEPHONES AND OPERATING METHODS THAT USE A SINGLE RADIO FREQUENCY CHAIN AND A SINGLE BASEBAND PROCESSOR FOR SPACE-BASED AND TERRESTRIAL COMMUNICATIONS

CROSS-REFERENCE TO RELATED APPLICATIONS

This application is a continuation-in-part (CIP) of application Ser. No. 10/225,613, filed Aug. 28, 2002 now U.S. Pat. No. 7,181,161, entitled Multi-Band/Multi-Mode Satellite Radiotelephone Communication Systems and Methods, which claims the benefit of provisional Application Ser. No. 60/383,690, filed May 28, 2002, entitled Multi-Band/Multi-Mode Satellite Radiotelephone Communications Systems and Methods and provisional Application Ser. No. 60/388,087, filed Jun. 12, 2002, entitled Multi-Band/Multi-Mode Satellite Radiotelephone Communications Systems and Methods; and which itself is a continuation-in-part (CIP) of application Ser. No. 10/074,097, filed Feb. 12, 2002 now U.S. Pat. No. 6,684,057, entitled Systems and Methods for Terrestrial Reuse of Cellular Satellite Frequency Spectrum, which itself claims the benefit of provisional application Ser. No. 60/322,240, filed Sep. 14, 2001, entitled Systems and Methods for Terrestrial Re-Use of Mobile Satellite Spectrum, all of which are assigned to the assignee of the present application, the disclosures of all of which are hereby incorporated herein by reference in their entirety as if set forth fully herein.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna pattern (beam) covering an entire area served by the system. Alternatively, in cellular satellite radiotelephone communications systems and methods, multiple antenna patterns (beams or cells) are provided, each of which can serve substantially distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward service link, and from the radiotelephone to the satellite over an uplink or return service link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal", a "wireless terminal" or simply as a "terminal". As used herein, the term (s) "radiotelephone", "radioterminal", "wireless terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrectrial location(s).

Terrestrial networks can enhance cellular satellite radiotelephone system availability, efficiency and/or economic viability by terrestrially reusing at least some of the frequencies that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into and/or out of buildings. As a result, the satellite spectrum may be underutilized or unutilized in such areas. The use of terrestrial retransmission/reception of at least some of the frequencies that are allocated to the cellular satellite radiotelephone system can reduce or eliminate this potential problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., in densely populated urban/industrial/commercial areas. As a result, the overall system can become much more economically viable, as it may be able to serve a much larger subscriber base.

One example of terrestrial reuse of satellite frequencies is described in U.S. Pat. No. 5,937,332 to the present inventor Karabinis entitled *Satellite Telecommunications Repeaters and Retransmission Methods*, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Finally, satellite radiotelephones for a satellite radiotelephone system or method having a terrestrial component within the same satellite frequency band and using substantially the same air interface for both terrestrial and satellite communications can be cost effective and/or aesthetically appealing. Conventional dual band/dual mode radiotelephone alternatives, such as the well known Thuraya, Iridium and/or Globalstar dual mode satellite/terrestrial radiotelephone systems, may duplicate some components, which may lead to increased cost, size and/or weight of the radiotelephone. See U.S. Pat. No. 6,052,560 to the present inventor Karabinis, entitled *Satellite System Utilizing a Plurality of Air Interface Standards and Method Employing Same.*

In view of the above discussion, there continues to be a need for systems and methods for terrestrial reuse of cellular satellite frequencies that can allow improved reliability, capacity, cost effectiveness and/or aesthetic appeal for cellular satellite radiotelephone systems, methods and/or satellite radiotelephones.

SUMMARY OF THE INVENTION

Radiotelephones according to exemplary embodiments of the present invention include a single radio frequency chain and a single baseband processor that is connected thereto. The single radio frequency chain and the single baseband processor are configured to communicate with a space-based system using frequencies of a satellite band and an air interface, and to communicate with a terrestrial wireless network using frequencies of the satellite band and substantially the same air interface. In some embodiments, the satellite band of frequencies comprises a satellite S-band and/or a satellite L-band. The communications with the space-based system and with the terrestrial wireless network using frequencies of the satellite band and substantially the same air interface may occur in a common geographic area.

In some embodiments, the single radio frequency chain includes a common antenna that is configured to communicate with the space-based system using frequencies of the satellite band and the air interface, and to communicate with the terrestrial wireless network using frequencies of the satellite band and substantially the same air interface. A common transmit chain is configured to transmit communications from the baseband processor to the space-based system via the common antenna using frequencies of the satellite band and the air interface, and to transmit communications from the baseband processor to the terrestrial wireless network via the common antenna using frequencies of the satellite band and substantially the same air interface. Moreover, a common receive chain is configured to receive communications for the baseband processor from the space-based system via the common antenna using frequencies of the satellite band and the air interface, and to receive communications for the baseband processor from the terrestrial wireless network via the common antenna using frequencies of the satellite band and substantially the same air interface.

In some embodiments, the common transmit chain includes a common up converter that is responsive to the baseband processor and a common power amplifier that is responsive to the common up converter. Moreover, the common antenna is responsive to the common power amplifier. In some embodiments, the common receive chain includes a common low noise amplifier that is responsive to the common antenna, and a common down converter that is responsive to the common low noise amplifier. The baseband processor is responsive to the common down converter. In still other embodiments, a common low pass filter is connected between the baseband processor and the common up converter, and a common bandpass filter is connected between the common power amplifier and the common antenna. Moreover, in yet other embodiments, a bandpass filter is connected between the common antenna and the common down converter, and a common low pass filter is connected between the common down converter and the baseband processor.

In some embodiments, the baseband processor includes a satellite-unique vocoder, a satellite-unique forward error connection coder and/or a satellite-unique interleaver. In other embodiments, the baseband processor includes a common logic and memory section, a first logic section that is configured to provide terrestrial wireless network communication functionality, and a second logic section that is configured to provide space-based system communication functionality. In some embodiments, the single radio frequency chain and/or the single baseband processor that is connected thereto are/is also configured to communicate with an ad hoc short range wireless network, such as Bluetooth.

In some embodiments, the common antenna is of a size that is similar to a conventional cellular radiotelephone antenna. In other embodiments, the common antenna is smaller than an antenna of a Globalstar or Iridium radiotelephone. In still other embodiments, the common power amplifier and the common antenna are configured to radiate a maximum power and/or Equivalent Isotropic Radiated Power (EIRP) level when transmitting to the space-based system that is the same or substantially the same to a maximum power and/or Equivalent Isotropic Radiated Power (EIRP) level that may be radiated when communicating with the terrestrial wireless network.

Finally, in some embodiments, the air interface may be a Time Division Multiple Access (TDMA), Code Division Multiple Access (CDMA), Frequency Division Duplex (FDD) and/or Time Division Duplex (TDD) air interface.

It will be understood that embodiments of the invention have been described above primarily in connection with radiotelephones. However, analogous radiotelephone operating methods also may be provided according to various embodiments of the invention.

BRIEF DESCRIPTION OF THE DRAWINGS

FIG. 4 is a schematic diagram of cellular satellite systems and methods according to other embodiments of the present invention.

FIG. 8 graphically illustrates mapping of monotonically increasing power levels to frequencies according to embodiments of the present invention.

FIG. 9 illustrates an ideal cell that is mapped to three power regions and three associated carrier frequencies according to embodiments of the invention.

FIG. 10 depicts a realistic cell that is mapped to three power regions and three associated carrier frequencies according to embodiments of the invention.

DETAILED DESCRIPTION OF PREFERRED EMBODIMENTS

Figure 1:
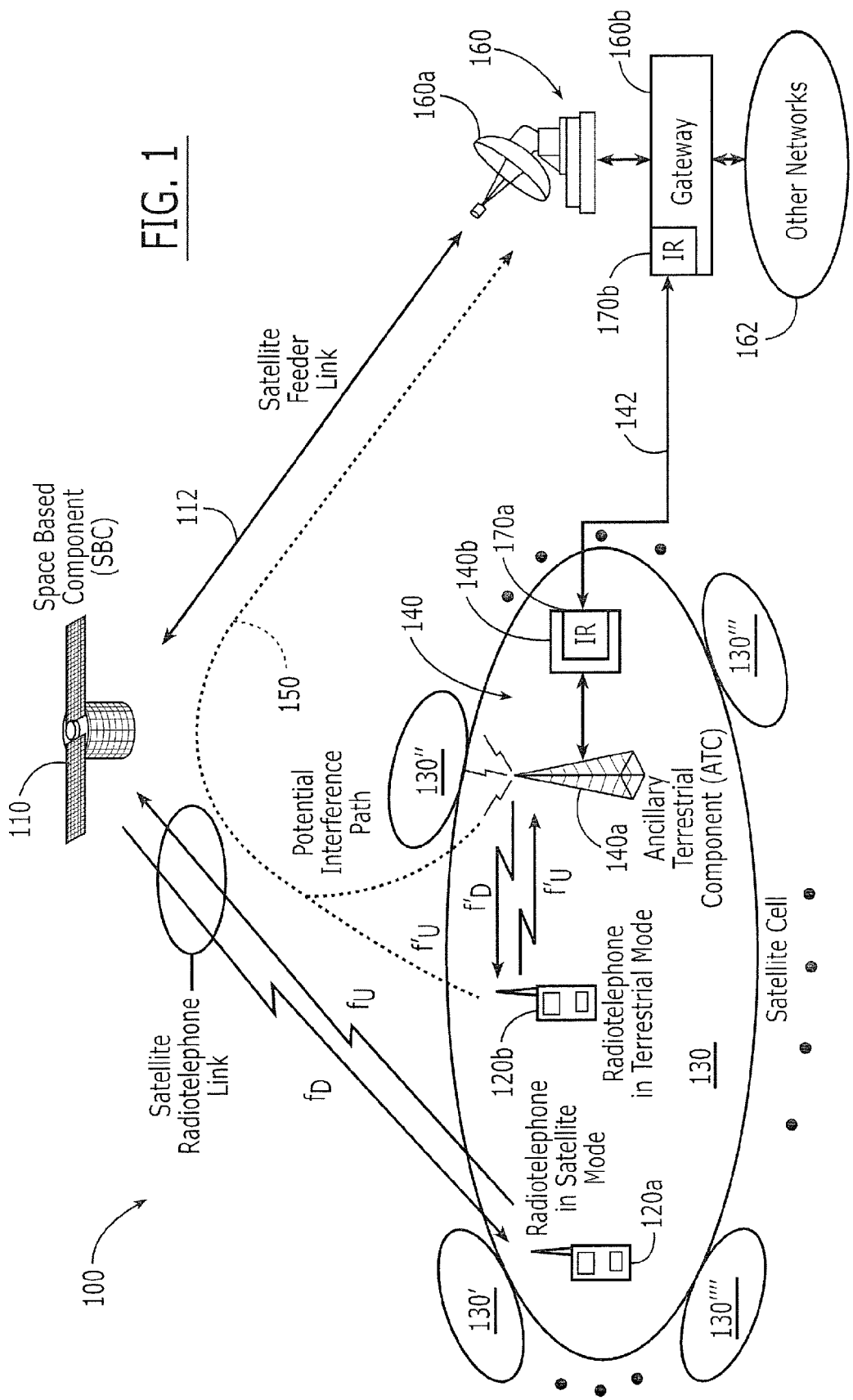
FIG. 1 is a schematic diagram of cellular satellite radiotelephone systems and methods according to embodiments of the invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first radiotelephone below could be termed a second radiotelephone, and similarly, a second radiotelephone may be termed a first radiotelephone without departing from the teachings of the present invention. As used herein, the term "and/or" includes any and all combinations of one or more of the associated listed items. The symbol "/" is also used as a shorthand notation for "and/or".

Moreover, as used herein, "substantially the same" band(s) means that two or more bands being compared substantially overlap in frequency, but that there may be some areas of non-overlap, for example at a band end(s). "Substantially the same" air interface(s) means that two or more air interfaces being compared are similar but need not be identical. Some differences may exist in one air interface (i.e., a satellite air interface) relative to another (i.e., a terrestrial air interface) to account for and/or accommodate different characteristics that may exist between, for example, a terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

FIG. 1 is a schematic diagram of cellular satellite radiotelephone systems and methods according to embodiments of the invention. As shown in FIG. 1, these cellular satellite radiotelephone systems and methods 100 include at least one Space-Based Component (SBC) 110, such as a satellite. The space-based component 110 is configured to transmit wireless communications to a plurality of radiotelephones 120a, 120b in a satellite footprint comprising one or more satellite radiotelephone cells 130-130'''' over one or more satellite radiotelephone forward service link (downlink) frequencies $f_D$. The space-based component 110 is configured to receive wireless communications from, for example, a first radiotelephone, 120a, in the satellite radiotelephone cell 130 over a satellite radiotelephone return service link (uplink) frequency $f_U$. An ancillary terrestrial network, comprising at least one ancillary terrestrial component 140, which may include an antenna 140a and an electronics system 140b (for example, at least one antenna 140a and at least one electronics system 140b), is configured to receive wireless communications from, for example, a second radiotelephone 120b in the radiotelephone cell 130 over the satellite radiotelephone uplink frequency, denoted $f'_U$, which may be the same as $f_U$. Thus, as illustrated in FIG. 1, radiotelephone 120a may be communicating with the space-based component 110 while radiotelephone 120b may be communicating with the ancillary terrestrial component 140. As shown in FIG. 1, the space-based component 110 also undesirably receives a component of the wireless communications from the second radiotelephone 120b in the satellite radiotelephone cell 130 over the satellite radiotelephone frequency $f'_U$ as interference. More specifically, a potential interference path is shown at 150. In this potential interference path 150, the return link signal of the second radiotelephone 120b at carrier frequency $f'_U$ interferes with satellite communications. This interference would generally be strongest when $f'_U = f_U$, because, in that case, the same return link frequency would be used for space-based component and ancillary terrestrial component communications and, if used over the same satellite radiotelephone cell, no substantial spatial discrimination between satellite radiotelephone cells would appear to exist to reduce a level of interference.

Still referring to FIG. 1, embodiments of satellite radiotelephone systems/methods 100 can include at least one gateway 160 that can include an antenna 160a and an electronics system 160b that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170a also may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 100 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 and is at least partially generated by the second radiotelephone 120b in the satellite radiotelephone cell 130 over the satellite radiotelephone frequency $f'_U$. The interference reducer 170a and/or 170b uses the wireless communications $f'_U$ that are intended for the ancillary terrestrial component 140 from the second radiotelephone 120b in the satellite radiotelephone cell 130 using the satellite radiotelephone frequency $f'_U$ to communicate with the ancillary terrestrial component 140.

In embodiments of the invention, as shown in FIG. 1, the ancillary terrestrial component 140 generally is closer to the first and second radiotelephones 120a and 120b, respectively, than is the space-based component 110, such that the wireless communications from the second radiotelephone 120b are received by the ancillary terrestrial component 140 prior to being received by the space-based component 110. The interference reducer 170a and/or 170b is configured to generate an interference cancellation signal comprising, for example, at least one delayed replica of the wireless communications from the second radiotelephone 120b that are received by the ancillary terrestrial component 140, and to subtract the delayed replica of the wireless communications from the second radiotelephone 120b that are received by the ancillary terrestrial component 140 from the wireless communications that are received from the space-based component 110. The interference reduction signal may be transmitted from the ancillary terrestrial component 140 to the gateway 160 over link 142 and/or using other conventional techniques.

Thus, adaptive interference reduction techniques may be used to at least partially cancel/reduce the interfering signal so that the same or other nearby satellite radiotelephone uplink frequency (or frequencies) can be used in a given cell for communications by radiotelephones 120 with the satellite 110 and with the ancillary terrestrial component 140. Accordingly, substantially all frequencies that may be assigned to a given satellite cell 130 may be used for both radiotelephone 120 communications with the space-based component 110 and with the ancillary terrestrial component 140 within the geographic area spanned by the given satellite cell. Without using interference reduction, a system may avoid (or limit) terrestrial reuse of frequencies within a given satellite cell that are being used within the satellite cell for satellite communications. Stated differently, without the use of interference reduction, only frequencies used by other satellite cells may be candidates for terrestrial reuse within a given satellite cell unless the given satellite cell comprises a sufficiently low gain and/or a terrestrial reuse of frequencies is sufficiently limited so as to not substantially detect by a space-based component 110 a strong interference signal over an interference path such as, for example, interference path 150 illustrated in FIG. 1. Accordingly, a satellite system comprising sufficiently high-gain return service link cells (spot beams or antenna patterns) that does not use interference reduction may rely on beam-to-beam (cell-to-cell) spatial isolation that may be provided by different satellite cells to reduce or minimize a level of interference from terrestrial operations into satellite operations. Such a system may also limit a frequency reuse of the terrestrial operations in order to maintain at an acceptable level a measure of interference into the satellite operations. In sharp contrast, embodiments of the present invention can use an interference reducer to allow some or all frequencies assigned to a satellite cell to be used terrestrially and for satellite radiotelephone communications within the same satellite cell and at an increased or maximum frequency reuse, thereby increasing or maximizing spectral efficiency and system capacity and reducing costs associated with terrestrial cell splitting.

Embodiments of the invention according to FIG. 1 may arise from a realization that the return link signal from the second radiotelephone 120b at $f'_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160b can be at least partially reduced and/or canceled. Thus, as shown in FIG. 1, an interference reduction/cancellation signal, such as, for example, a received, demodulated and/or regenerated ancillary terrestrial component signal, can be sent to the satellite gateway 160b by the interference reducer 170a in the ancillary terrestrial component 140, for example using link 142. In the interference reducer 170b at the gateway 160b, a weighted (in amplitude and/or phase) replica of the signal may be formed using, for example, adaptive transversal filter techniques (and/or other techniques) that are well known to those having skill in the art. Then, an output signal, such as, for example, a transversal filter output signal, may be subtracted from an aggregate received satellite signal at frequency $f'_U$ that contains desired as well as interference signals. In some embodiments, the interference reduction/cancellation process need not substantially degrade a signal-to-noise ratio of the desired signal at the gateway 160, because a regenerated (noise-free) terrestrial signal, for example as regenerated by the ancillary terrestrial component 140, can be used to perform interference suppression.

Figure 2:
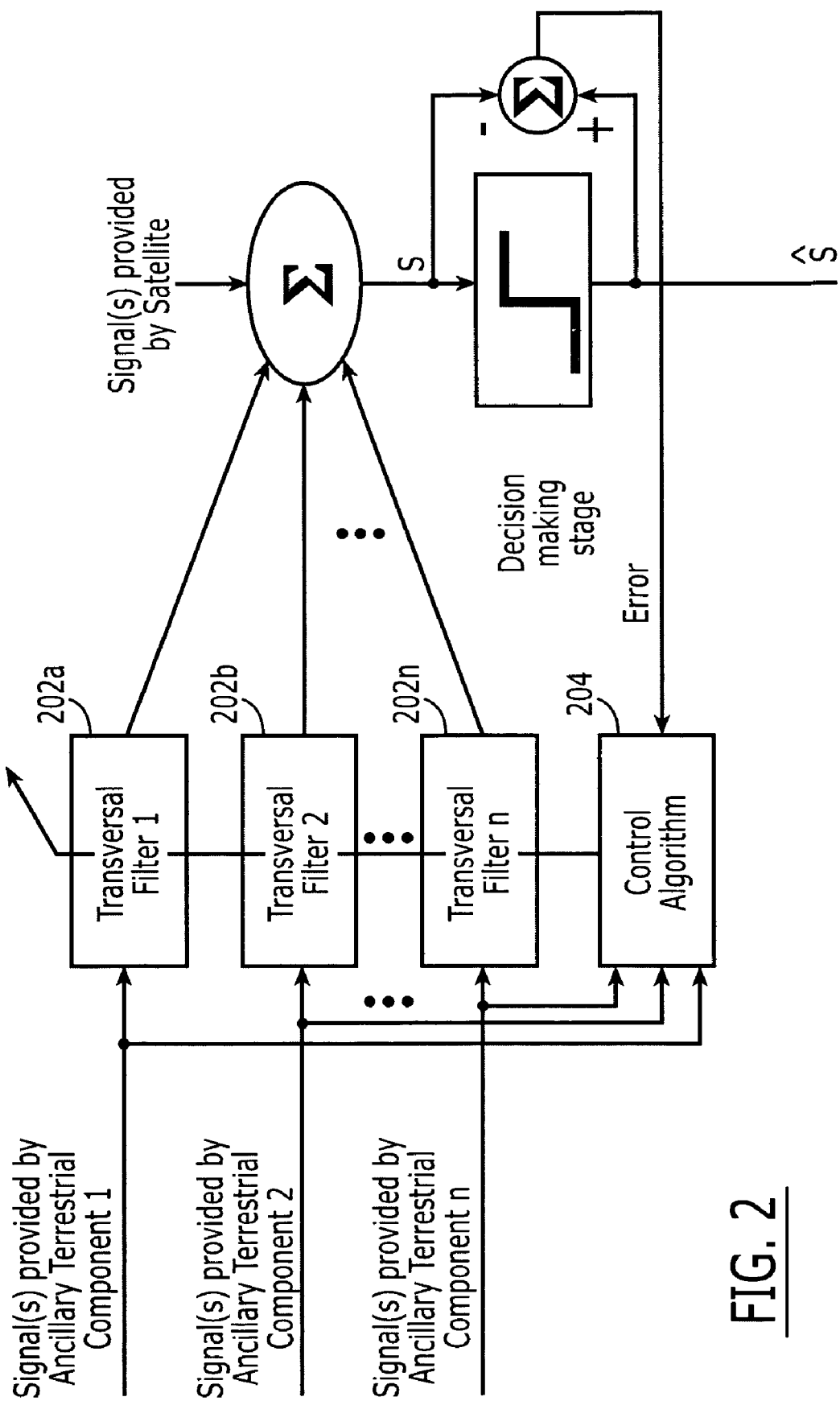
FIG. 2 is a block diagram of adaptive interference reducers according to embodiments of the present invention.

FIG. 2 is a block diagram of embodiments of adaptive interference reducers/cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a-202n. Adaptive algorithms, such as a Least Mean Squared Error (LMSE), Kalman, Fast Kalman, Zero Forcing and/or various combinations thereof or other techniques may be used. It will be understood by those having skill in the art that the architecture of FIG. 2 may be used with an LMSE algorithm. However, it also will be understood by those having skill in the art that conventional architectural modifications may be made to facilitate other control algorithms.

Figure 3:
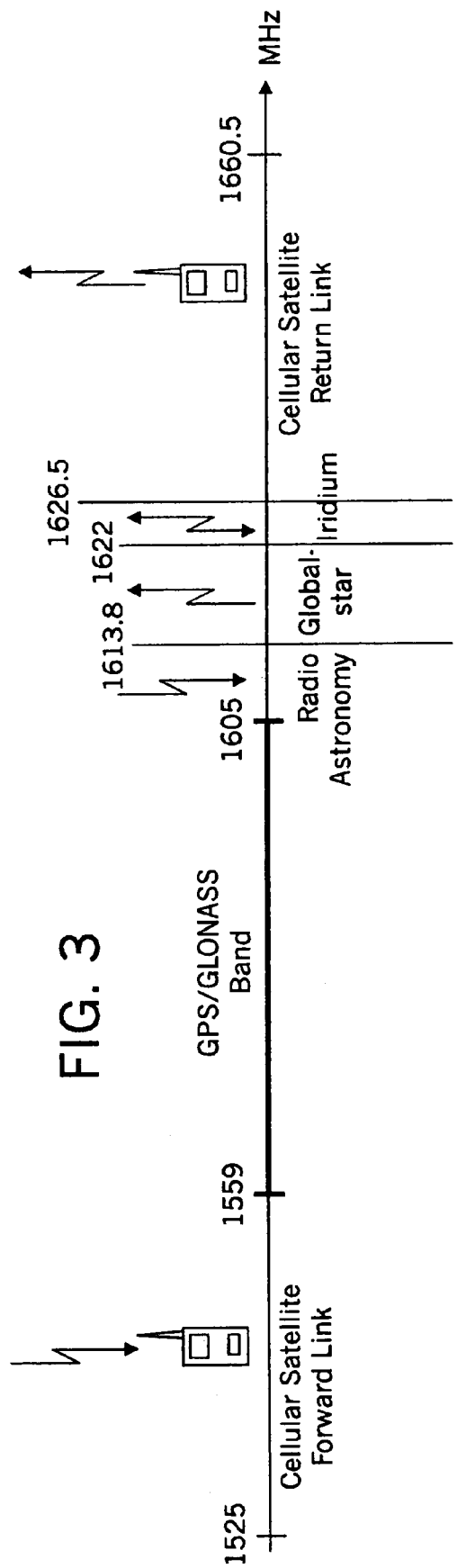
FIG. 3 is a spectrum diagram that illustrates satellite L-band frequency allocations.

Additional embodiments of the invention now will be described with reference to FIG. 3, which illustrates L-band frequency allocations including cellular radiotelephone system forward service links and return service links. As shown in FIG. 3, the space-to-ground L-band forward service link (downlink) frequencies are assigned from 1525 MHz to 1559

MHz. The ground-to-space L-band return service link (uplink) frequencies occupy the band from 1626.5 MHz to 1660.5 MHz. Between the forward and return L-band service link frequencies exists a GPS/GLONASS radionavigation band (from 1559 MHz to 1605 MHz).

In the detailed description to follow, GPS/GLONASS will be referred to simply as GPS for the sake of brevity. Moreover, the acronyms ATC and SBC will be used for the ancillary terrestrial component and the space-based component, respectively, for the sake of brevity.

As is known to those skilled in the art that GPS receivers may be sensitive since they are designed to operate on very weak spread-spectrum radionavigation signals that are radiated by a GPS satellite constellation. As a result, GPS receivers may be highly susceptible to in-band interference. ATCs that are configured to radiate L-band frequencies in the forward satellite band (1525 to 1559 MHz) can be designed with very sharp out-of-band emissions filters to satisfy the stringent out-of-band spurious emissions desires of GPS.

Referring again to FIG. 1, some embodiments of the invention can provide systems and methods that can allow an ATC 140 to configure itself in one of at least two modes. In accordance with a first mode, which may be a standard mode and may provide highest capacity, the ATC 140 transmits to the radiotelephones 120 over the frequency range from 1525 MHz to 1559 MHz, and receives transmissions from the radiotelephones 120 in the frequency range from 1626.5 MHz to 1660.5 MHz, as illustrated in FIG. 3. In contrast, in a second mode of operation, the ATC 140 transmits wireless communications to the radiotelephones 120 over a modified range of satellite band forward link (downlink) frequencies. The modified range of satellite band forward link frequencies may be selected to reduce, compared to the unmodified range of satellite band forward link frequencies, interference with wireless receivers such as, for example, GPS receivers that operate outside the range of satellite band forward link frequencies.

Many modified ranges of satellite band forward link frequencies may be provided according to embodiments of the present invention. In some embodiments, the modified range of satellite band forward link frequencies can be limited to a subset of the original range of satellite band forward link frequencies, so as to provide a guard band of unused satellite band forward link frequencies. In other embodiments, all of the satellite band forward link frequencies are used, but the wireless communications to the radiotelephones are modified in a manner to reduce interference with wireless receivers that operate outside the range of satellite band forward link frequencies. Combinations and subcombinations of these and/or other techniques also may be used, as will be described below.

It also will be understood that embodiments of the invention that will now be described in connection with FIGS. 4-12 will be described in terms of multiple mode ATCs 140 that can operate in a first standard mode using the standard forward and return links of FIG. 3, and in a second or alternate mode that uses a modified range of satellite band forward link frequencies and/or a modified range of satellite band return link frequencies. These multiple mode ATCs can operate in the second, non-standard mode, as long as desirable, and can be switched to standard mode otherwise. However, other embodiments of the present invention need not provide multiple mode ATCs but, rather, can provide ATCs that operate using the modified range of satellite band forward link and/or return link frequencies.

Embodiments of the invention now will be described, wherein an ATC operates with an SBC that is configured to receive wireless communications from radiotelephones over a first range of satellite band return link frequencies and to transmit wireless communications to the radiotelephones over a second range of satellite band forward link frequencies that is spaced apart from the first range. According to these embodiments, the ATC is configured to use at least one time division duplex frequency to transmit wireless communications to the radiotelephones and to receive wireless communications from the radiotelephones at different times. In particular, in some embodiments, the at least one time division duplex frequency that is used to transmit wireless communications to the radiotelephones and to receive wireless communications from the radiotelephones at different times, comprises a frame including a plurality of slots. At least a first one of the slots is used to transmit wireless communications to the radiotelephones and at least a second one of the slots is used to receive wireless communications from the radiotelephones. Thus, in some embodiments, the ATC transmits and receives, in Time Division Duplex (TDD) mode, using frequencies from 1626.5 MHz to 1660.5 MHz. In some embodiments, all ATCs across the entire network may have the stated configuration/reconfiguration flexibility. In other embodiments, only some ATCs may be reconfigurable.

Figure 5:
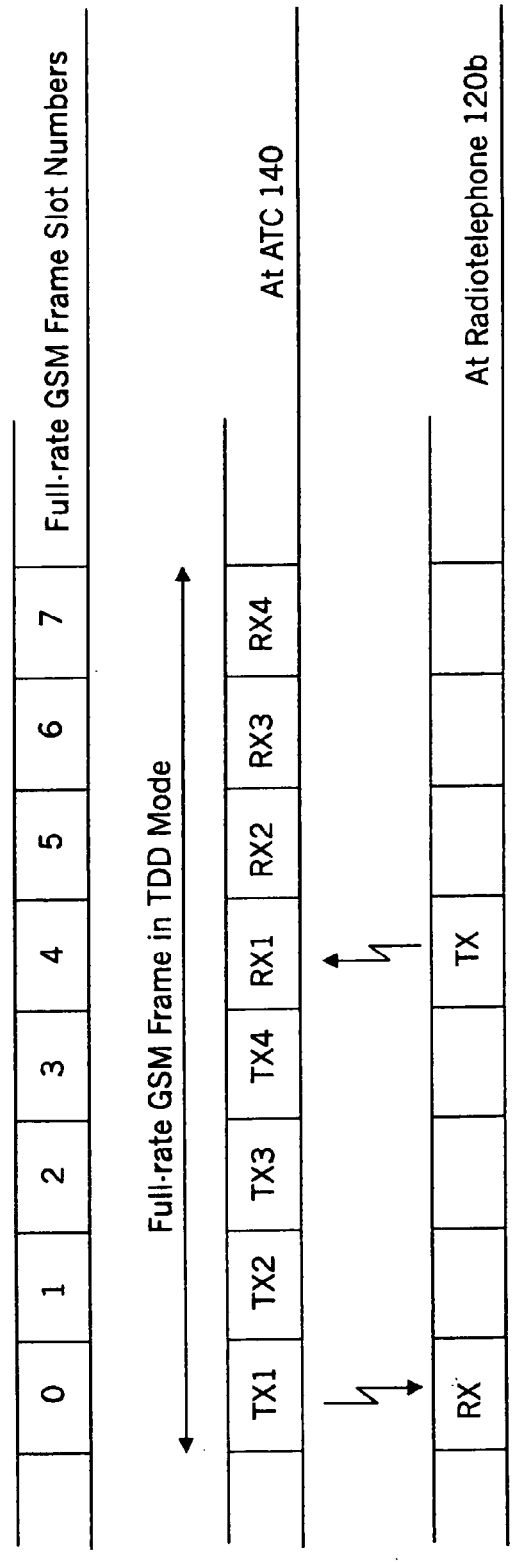
FIG. 5 illustrates time division duplex frame structures according to embodiments of the present invention.

FIG. 4 illustrates satellite systems and methods 400 according to some embodiments of the invention, including an ATC 140 communicating with a radiotelephone 120b using a carrier frequency $f''_U$ in TDD mode. FIG. 5 illustrates an embodiment of a TDD frame structure. Assuming full-rate GSM (eight time slots per frame), up to four full-duplex voice circuits can be supported by one TDD carrier. As shown in FIG. 5, the ATC 140 transmits to the radiotelephone 120b over, for example, time slot number 0. The radiotelephone 120b receives and replies back to the ATC 140 over, for example, time slot number 4. Time slots number 1 and 5 may be used to establish communications with another radiotelephone, and so on.

A Broadcast Control CHannel (BCCH) may be transmitted from the ATC 140 in standard mode and/or in TDD mode. In any of these embodiments, radiotelephones in idle mode can, per established GSM methodologies, monitor the BCCH and receive system-level and paging information. When a radiotelephone is paged, the system may decide what type of resource to allocate to the radiotelephone in order to establish a communications link. Whatever type of resource is allocated to the radiotelephone communications channel (TDD mode or standard mode), the information is communicated to the radiotelephone, for example as part of the call initialization routine, and the radiotelephone configures itself appropriately.

It may be difficult for the TDD mode to co-exist with the standard mode in a given ATC, due to, for example, overload concerns relating to the ATC receiver LNA stage and/or other ATC electronics. In particular, assuming a combination of standard and TDD mode carriers in the same ATC, during the part of the frame when the TDD carriers are used to serve a forward link (when the ATC is transmitting TDD) enough energy may leak into a standard-mode receiver front end of the same ATC to overload a LNA stage and/or generate intermodulation products.

Those skilled in the art will recognize that appropriate engineering techniques may be used to reduce or eliminate an overload potential associated with an ATC receiver, to thereby allow mixed standard mode and TDD mode operation of an ATC. For example, isolation between forward link and return link ATC electronics and/or antenna system may be increased or maximized. A switchable band-reject filter may be placed in front of a LNA stage. This filter may be switched in during the part of a frame when the ATC is transmitting TDD, and switched out during the rest of the time. An adaptive interference canceller may be configured prior to the LNA stage to reduce or eliminate overload potential, etc. By using such techniques, interference suppression of the order of 70 dB (or more) may be attained, which may allow mixed standard mode and TDD mode operation of an ATC. However, the ATC complexity and/or cost may increase.

Thus, even though according to some embodiments of the invention ATC overload potential may be reduced or eliminated to thereby allow standard mode and TDD mode operation of an ATC, such approach may require significant special engineering and cost. Other embodiments, therefore, may keep TDD ATCs pure TDD, with the exception, perhaps, of the BCCH carrier which may not be used for traffic but only for broadcasting over the first part of the frame, consistent with TDD protocol. Moreover, Random Access CHannel (RACH) bursts may be timed so that they arrive at the ATC during the second half of the TDD frame. In some embodiments, all TDD ATCs may be equipped to enable reconfiguration in response to a command.

It is well recognized that during data communications or other applications, the forward link may use transmissions at higher rates than the return link. For example, in web browsing with a radiotelephone, mouse clicks and/or other user selections typically are transmitted from the radiotelephone to the system. The system, however, in response to a user selection, may have to send one or more large data files to the radiotelephone. Hence, other embodiments of the invention may be configured to enable use of an increased or maximum number of time slots per forward carrier frame, to provide a higher downlink data rate to the radiotelephones.

Thus, when a carrier frequency is configured to provide service in TDD mode, a decision may be made as to how many slots will be allocated to serve forward links, and how many slots will be dedicated to return links. Whatever the decision is, it may be desirable that it be adhered to by all TDD carriers deployed by an ATC, in order to reduce or avoid potential overload interference, as described earlier. In voice communications, the partition between forward and return link slots may be made symmetrically (at substantially a center of a frame) as voice activity is statistically bidirectionally symmetric. Accordingly, in some embodiments, the center of a TDD frame may be where a partition between transmit and receive is drawn.

To increase or maximize forward link throughput in data mode, data mode TDD carriers according to embodiments of the invention may use a more spectrally efficient modulation and/or protocol, such as, for example, the EDGE modulation and/or protocol, on the forward link slots. The return link slots may be based on a less spectrally efficient modulation and/or protocol such as, for example, the GPRS (GMSK) modulation and/or protocol. The EDGE modulation/protocol and the GPRS modulation/protocol are well known to those having skill in the art, and need not be described further herein. Given, for example, an EDGE forward and GPRS return TDD carrier strategy, up to (384/2)=192 kbps may be supported on the forward link while on the return link a radiotelephone may transmit at up to (115/2)≈64 kbps.

In other embodiments, it also is possible to allocate six time slots of an eight-slot frame to one or more forward links and only two time slots to one or more return links. In these embodiments, for voice services, given the statistically symmetric nature of voice, a return link vocoder may be configured to accommodate a substantially quarter-rate mode, while a forward link vocoder may be configured to operate at a substantially full-rate mode, to yield six full-duplex voice circuits per TDD-mode carrier (a voice capacity penalty of 25% relative to a standard operation). Subject to this exemplary non-symmetrical partitioning strategy, using a GSM-based protocol with 200 kHz carrier spacing, data rates of up to (384)(6/8)=288 kbps may be achieved on a forward link, with up to (115)(2/8)≈32 kbps on a return link.

Figure 6:
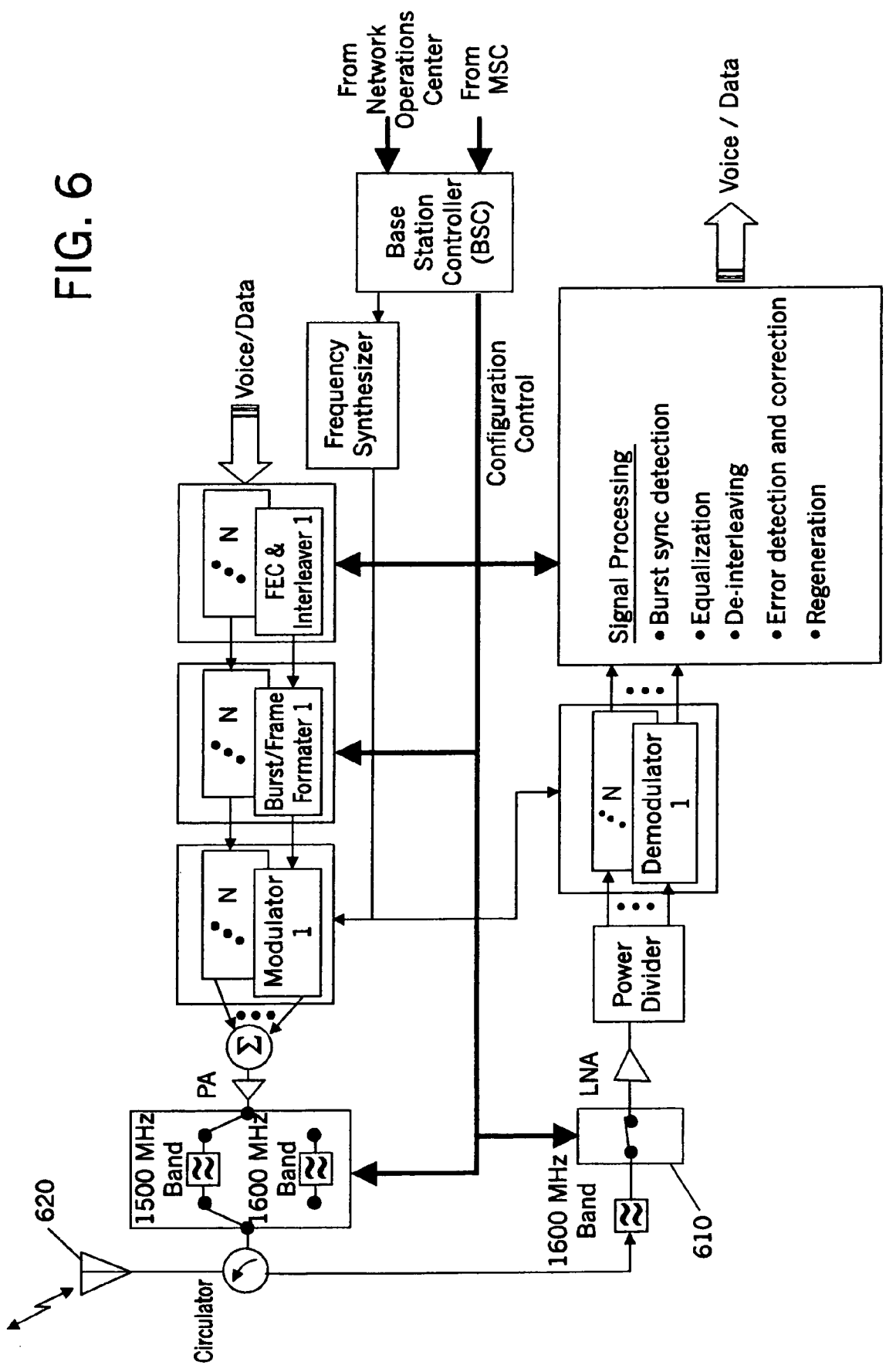
FIG. 6 is a block diagram of architectures of ancillary terrestrial components according to embodiments of the invention.

FIG. 6 illustrates an ATC architecture, according to embodiments of the invention, which can lend itself to manual and/or automatic configuration and/or reconfiguration between the two modes of, for example, standard GSM and TDD GSM. The ATC architecture illustrated in FIG. 6 may, for example, configure/reconfigure itself via a command, from, for example, a Network Operations Center (NOC) via a Base Station Controller (BSC) and/or other system element(s)/component(s) and/or via manual intervention of an operator/technician. It will be understood that in these embodiments, an antenna 620 can correspond to the antenna 140a of FIGS. 1 and 4, and the remainder of FIG. 6 can correspond to the electronics system 140b of FIGS. 1 and 4. If a reconfiguration command for a particular carrier, or set of carriers, occurs while the carrier(s) are active and are supporting traffic, then, via an in-band signaling channel such as, for example, a Fast Associated Control CHannel (FACCH), all affected radiotelephones may be notified to also reconfigure themselves appropriately and/or switch over to new resources. If one or more carriers is/are reconfigured from a TDD mode to a standard mode, a reassignment of the carrier(s) to one or more standard-mode ATCs, based on, for example, a capacity demand and/or reuse pattern may be initiated manually and/or automatically by the NOC/BSC and/or other system element. If one or more carriers is/are reconfigured from a standard mode to a TDD mode, a reassignment to the appropriate TDD-mode ATCs may be initiated manually and/or automatically by the NOC/BSC and/or other system element.

Still referring to FIG. 6, a switch 610 may remain closed when carriers are to be demodulated in the standard mode. In TDD mode, this switch 610 may be open during the first half of the frame, when the ATC is transmitting, and closed during the second half of the frame, when the ATC is receiving. Other embodiments also may be provided.

FIG. 6 illustrates N transceivers per ATC sector, for example, where N can be as small as one, since a minimum of one carrier per sector generally is desired. Each transceiver is assumed to operate over one GSM carrier pair (when in standard mode) and can thus support up to eight full-duplex voice circuits, neglecting BCCH channel overhead. Moreover, a standard GSM carrier pair can support sixteen full-duplex voice circuits when in half-rate GSM mode, and up to thirty two full-duplex voice circuits when in quarter-rate GSM mode, etc.

Figure 7:
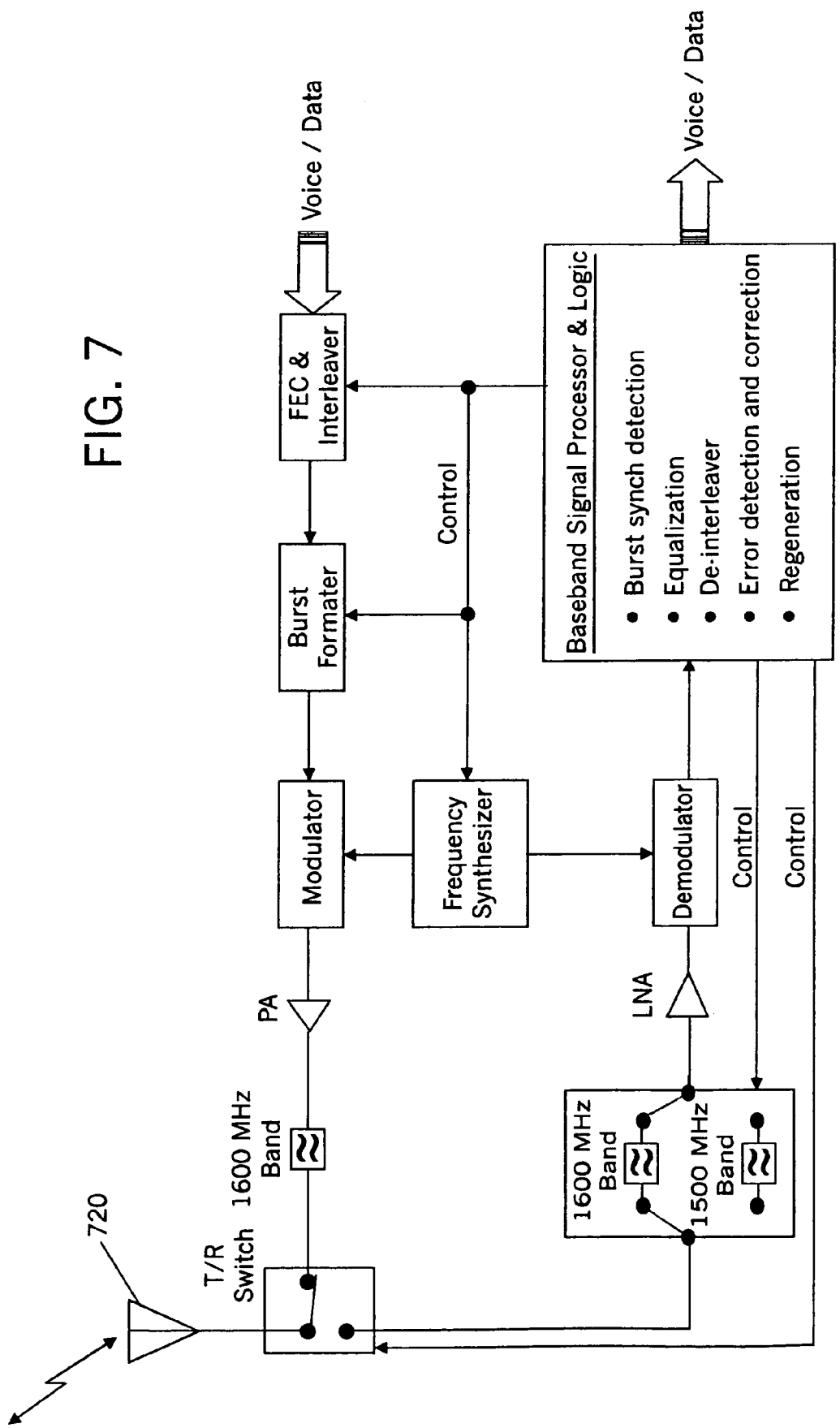
FIG. 7 is a block diagram of architectures of reconfigurable radiotelephones according to embodiments of the invention.

When in TDD mode, the number of full duplex voice circuits may be reduced by a factor of two, assuming the same vocoder. However, in TDD mode, voice service can be offered via the half-rate GSM vocoder with almost imperceptible quality degradation, in order to maintain invariant voice capacity. FIG. 7 is a block diagram illustration of a reconfigurable radiotelephone architecture that can communicate with a reconfigurable ATC architecture of FIG. 6. In FIG. 7, an antenna 720 is provided, and the remainder of FIG. 7 can provide embodiments of an electronics system for the radiotelephone.

It will be understood that the ability to reconfigure ATCs and radiotelephones according to embodiments of the invention may be obtained at a relatively small increase in cost. The cost may be mostly in Non-Recurring Engineering (NRE) cost to develop software/hardware. Some recurring cost may also be incurred, however, in that at least an additional RF filter and a few electronically controlled switches may be used per ATC and radiotelephone. All other hardware/software can be common to standard-mode and TDD-mode GSM.

Referring now to FIG. 8, other radiotelephone systems and methods according to embodiments of the invention now will be described. In these embodiments, the modified second range of satellite band forward link frequencies includes a plurality of frequencies in the second range of satellite band forward link frequencies that are transmitted by the ATCs to the radiotelephones at a power level, such as maximum power level, that monotonically decreases as a function of (increasing) frequency. More specifically, as will be described below, in some embodiments, the modified second range of satellite band forward link frequencies includes a subset of frequencies proximate to a first or second end of the range of satellite band forward link frequencies that are transmitted by the ATC to the radiotelephones at a power level, such as a maximum power level, that is lower than an other level, such as an other maximum power level used by an ATC and/or monotonically decreases toward the first or second end of the second range of satellite band forward link frequencies. In still other embodiments, the first range of satellite band return link frequencies is contained in an L-band of satellite frequencies above GPS frequencies and the second range of satellite band forward link frequencies is contained in the L-band of satellite frequencies below the GPS frequencies. The modified second range of satellite band forward link frequencies includes a subset of frequencies proximate to an end and/or other location of the second range of satellite band forward link frequencies adjacent to, for example, the GPS frequencies and/or an other set of frequencies (such as, for example, a Search and Rescue (SAR) set of frequencies) that are transmitted by the ATC to the radiotelephones at a power level, such as a maximum power level, that is lower than an other power level of an ATC (such as an other maximum power level used by an ATC) and/or monotonically decreases toward the end of the second range of satellite band forward link frequencies adjacent the GPS frequencies and/or the other set of frequencies.

Without being bound by any specific theory/methodology of operation, a discussion of a mapping of ATC power levels, such as maximum power levels, to carrier frequencies according to embodiments of the present invention now will be described. Referring to FIG. 8, let $v=\mathcal{F}(\rho)$ represent a mapping from the power ($\rho$) domain to the frequency ($v$) range. The power ($\rho$) is the power that an ATC uses or should transmit in order to reliably communicate with a given radiotelephone. This power may depend on many factors such as the radiotelephone's distance from the ATC, the blockage between the radiotelephone and the ATC, the level of multipath fading in the channel, etc., and, as a result, will, in general, change as a function of time. Hence, the power used generally is determined adaptively (iteratively) via closed-loop power control, between the radiotelephone and ATC.

The frequency ($v$) may be a frequency of a satellite band that an ATC uses to communicate with a radiotelephone. According to embodiments of the invention, the mapping $\mathcal{F}$ may be a monotonically decreasing function, over a predetermined frequency interval, of the independent variable $\rho$. Consequently, in some embodiments, over a predetermined frequency interval, as the maximum power that may be used by an ATC is increased the carrier frequency that the ATC may use to establish and/or maintain a communications link is decreased. FIG. 8 illustrates an embodiment of a piece-wise continuous monotonically decreasing (stair-case) function for associating a power level with a frequency. Although in FIG. 8 a mapping of power level to frequency is illustrated over the frequency interval from 1525 to 1559 MHz, the mapping may, in some embodiments be defined over an other frequency interval, such as over a frequency interval comprising one or more contiguous and/or non-contiguous subsets of the frequency interval of FIG. 8. Furthermore, in some embodiments, the monotonicity of the mapping may be reversed, at least over one frequency interval (i.e., instead of associating a lower frequency with a higher power level, the lower frequency is associated with a lower power level, at least over a predetermined frequency interval). Other monotonic functions may also be used, including linear and/or nonlinear, constant and/or variable decreases/increases. Messaging such as, for example, FACCH and/or Slow Associated Control CHannel (SACCH) messaging may be used in embodiments of the invention to facilitate the mapping adaptively and in substantially real time.

FIG. 9 depicts an ideal ATC service region (cell) according to embodiments of the invention, where, for illustration purposes, three power regions and three associated carrier frequencies (or carrier frequency sets) are being used to partition a cell. For simplicity, one ATC transmitter at the center of the idealized cell is assumed with no sectorization. In embodiments of FIG. 9, the frequency (or frequency set) $f_I$ is associated with an end and/or other location of the second range of satellite band forward link frequencies adjacent/proximate to, for example, the GPS frequencies and/or an other set of frequencies (such as, for example, a Search and Rescue (SAR) set of frequencies) that are transmitted by the ATC to the radiotelephones at a power level, such as a maximum power level, that is lower than an other power level of an ATC (such as an other maximum power level used by an ATC). Correspondingly, the frequency (or frequency set) $f_M$ may be associated with a substantially distant portion of the L-band forward link frequency set relative to, for example, the GPS and/or the SAR frequencies, and the frequency (or frequency set) $f_O$ may be associated with substantially a lowest portion of the L-band forward link frequencies, for example close to 1525 MHz (see FIG. 3).

Thus, according to embodiments of FIG. 9, if a radiotelephone is being served within the outer-most ring of the cell, that radiotelephone is being served via frequency $f_O$. This radiotelephone, being within the furthest area from the ATC, has (presumably) requested maximum (or near maximum) power output from the ATC. In response to the maximum (or near maximum) output power request, the ATC uses its a priori knowledge of power-to-frequency mapping, such as a three-step staircase function of FIG. 9. Thus, the ATC serves the radiotelephone with a low-value frequency taken from the lowest portion of the L-band forward link frequency set, for example, from as close to 1525 MHz as possible. This, then, can provide additional safeguard to any GPS receiver unit that may be in the vicinity of the ATC.

Embodiments of FIG. 9 may be regarded as idealized because they associate concentric ring areas with carrier frequencies (or carrier frequency sets) used by an ATC to serve its area. In reality, concentric ring areas generally will not be the case. For example, a radiotelephone can be close to the ATC that is serving it, but with significant blockage between the radiotelephone and the ATC due to, for example, a building. Such a radiotelephone, even though relatively close to the ATC, may also request maximum (or near maximum) output power from the ATC. With this in mind, FIG. 10 may depict a more realistic set of area contours that may be associated with the frequencies being used by an ATC to serve a geographic area, according to embodiments of the invention. The frequency (or frequency set) $f_I$ may be reused in the immediately adjacent ATC cells owing to the limited geographical span associated with $f_I$ relative to the distance between cell centers. This may also hold for $f_M$.

Figure 11:
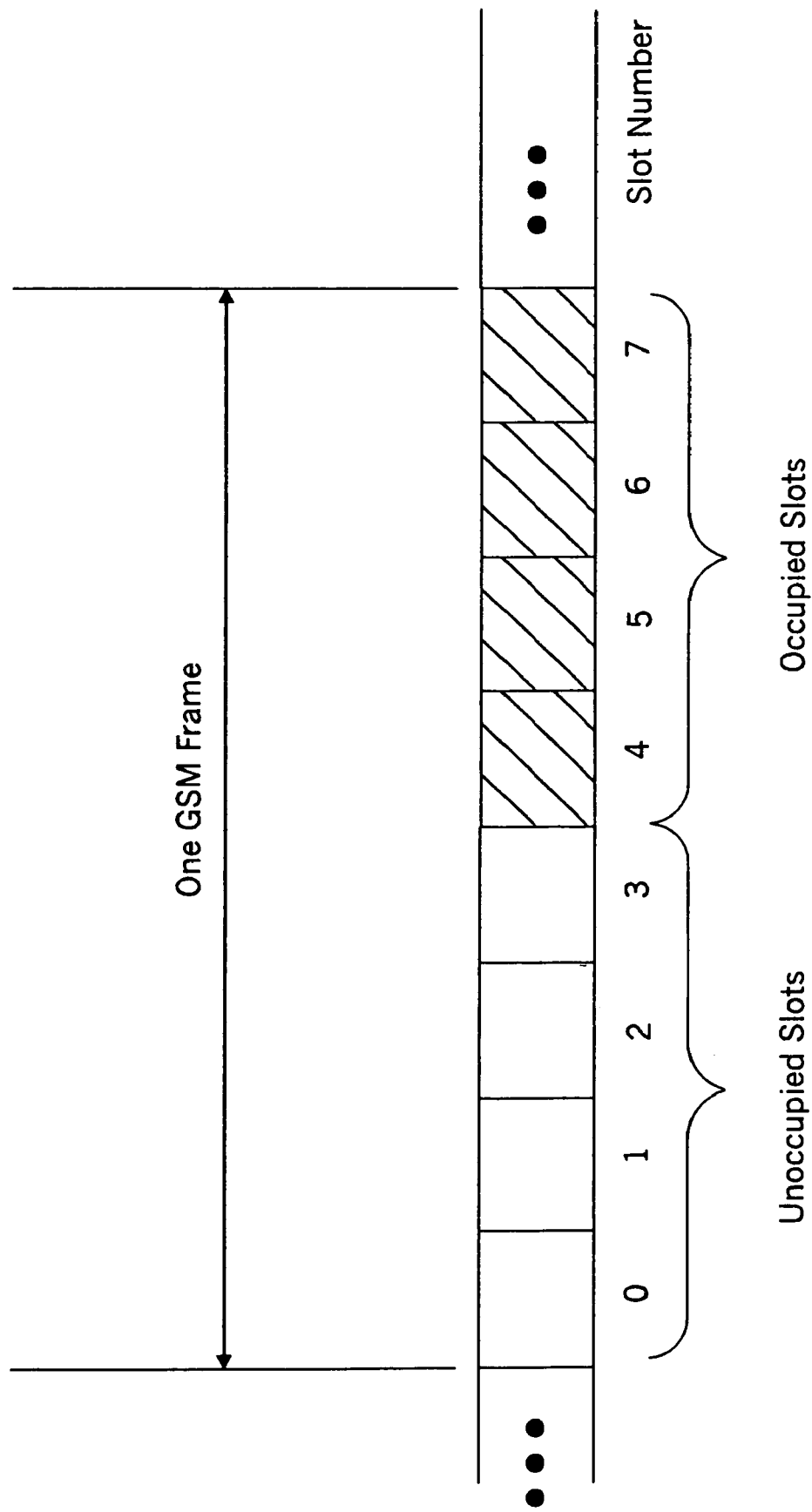
FIG. 11 illustrates two or more contiguous slots in a frame that are unoccupied according to embodiments of the present invention.

Referring now to FIG. 11, other modified second ranges of satellite band forward link frequencies that can be used by ATCs according to embodiments of the present invention now will be described. In these embodiments, at least one frequency in the modified second range of satellite band forward link frequencies that is transmitted by the ATC to the radiotelephones comprises a frame including a plurality of slots. In these embodiments, at least two contiguous slots in the frame that is transmitted by the ATC to the radiotelephones are left unoccupied. In other embodiments, three contiguous slots in the frame that is transmitted by the ATC to the radiotelephones are left unoccupied. In yet other embodiments, at least two contiguous slots in the frame that is transmitted by the ATC to the radiotelephones are transmitted at lower power than remaining slots in the frame. In still other embodiments, three contiguous slots in the frame that is transmitted by the ATC to the radiotelephones are transmitted at a lower power than the remaining slots in the frame. In yet other embodiments, the lower power slots may be used with first selected ones of the radiotelephones that are relatively close to the ATC and/or are experiencing relatively small signal blockage, and the remaining slots are transmitted at higher power to second selected ones of the radiotelephones that are relatively far from the ATC and/or are experiencing relatively high signal blockage.

Stated differently, in accordance with some embodiments of the invention, only a portion of the TDMA frame is utilized. For example, only the first four (or last four, or any contiguous four) time slots of, for example, a full-rate (eight slot) GSM frame are used to support traffic. The remaining slots are left unoccupied (empty). In these embodiments, capacity may be lost. However, as has been described previously, for voice services, a half-rate and even a quarter-rate vocoder may be used to gain capacity back, with some potential degradation in voice quality. The slots that are not utilized preferably are contiguous, such as slots 0 through 3 or 4 through 7 (or 2 through 5, etc.). The use of non-contiguous slots such as 0, 2, 4, and 6, for example, may be less desirable. FIG. 11 illustrates four slots (4-7) being used and four contiguous slots (0-3) being empty in a GSM frame.

It has been found experimentally, according to these embodiments of the invention, that GPS receivers can perform significantly better when the interval between interference bursts is increased or maximized. Without being bound by any theory of operation, this effect may be due to the relationship between the code repetition period of the GPS C/A code (1 msec.) and the GSM burst duration (about 0.577 msec.). With a GSM frame occupancy comprising alternate slots, each GPS signal code period can experience at least one "hit", whereas a GSM frame occupancy comprising four to five contiguous slots allows the GPS receiver to derive sufficient "clean" information so as to "flywheel" through the error events.

According to other embodiments of the invention, embodiments of FIGS. 8-10 can be combined with embodiments of FIG. 11. Furthermore, according to other embodiments of the invention, if an $f_I$ carrier of FIG. 9 or 10 is underutilized, because of the relatively small footprint of the inner-most region of the cell, it may be used to support additional traffic over the much larger outermost region of the cell.

Figure 12:
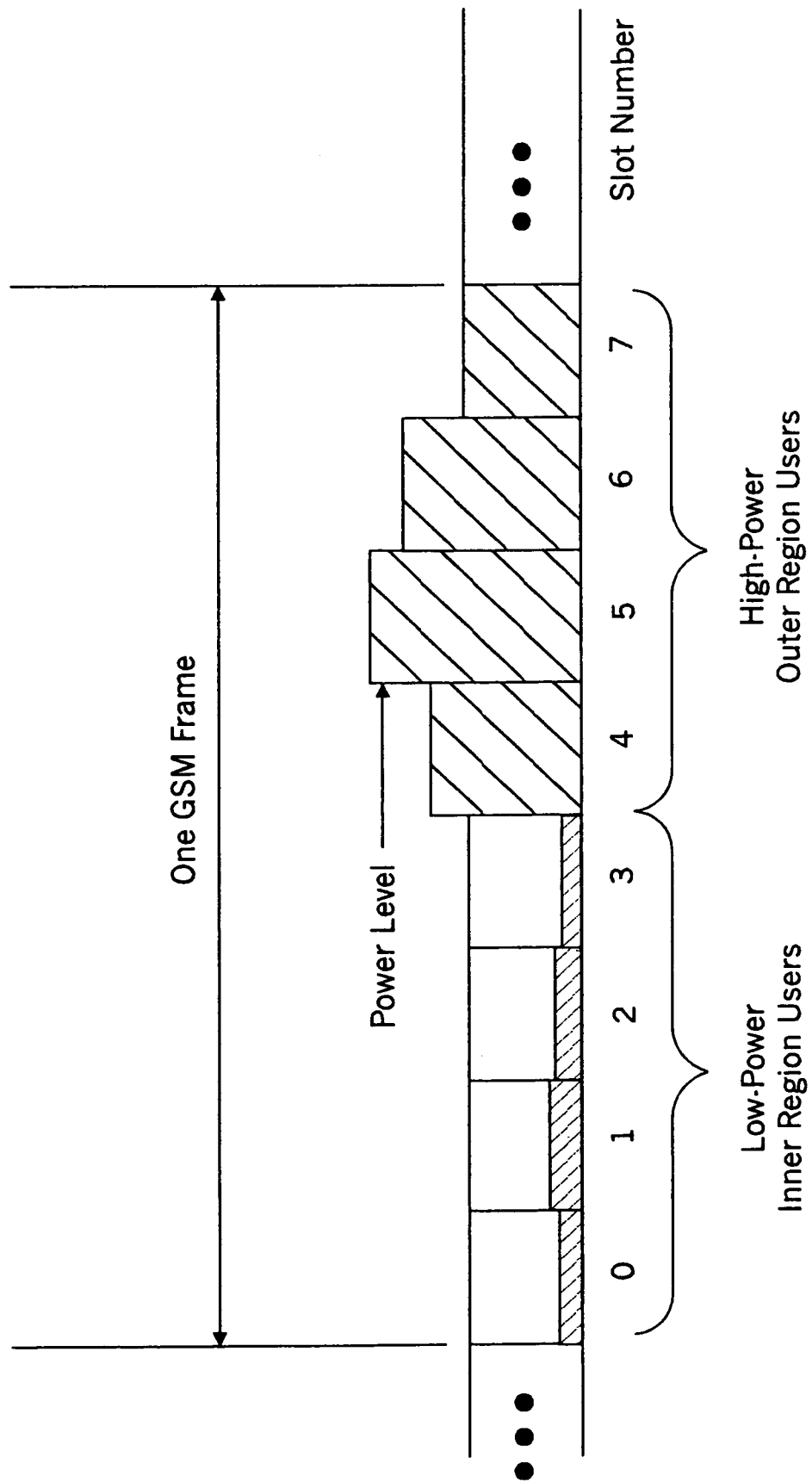
FIG. 12 illustrates loading of two or more contiguous slots with lower power transmissions according to embodiments of the present invention.

Thus, for example, assume that only the first four slots in each frame of $f_I$ are being used for inner region traffic. In embodiments of FIGS. 8-10, these four $f_I$ slots may be supporting relatively low power bursts (transmissions), for example of the order of 100 mW or less, and may, therefore, appear as (almost) unoccupied from an interference point of view. Loading the remaining four (contiguous) time slots of $f_I$ with relatively high-power bursts may have negligible effect on a GPS receiver because the GPS receiver would continue to operate reliably based on the benign contiguous time interval occupied by the four low-power bursts. FIG. 12 illustrates embodiments of a frame at carrier $f_I$ supporting four low-power (inner interval) users and four high-power (outer interval) users. In fact, embodiments illustrated in FIG. 12 may be a preferred strategy for the set of available carrier frequencies that are closest to the GPS band. These embodiments may avoid undue capacity loss by more fully loading the carrier frequencies.

The experimental finding that interference from GSM carriers can be relatively benign to GPS receivers provided that no more than, for example, 5 slots per 8 slot GSM frame are used in a contiguous fashion can be very useful. It can be particularly useful since this experimental finding may hold even when the GSM carrier frequency is brought very close to the GPS band (as close as 1558.5 MHz) and the power level is set relatively high. For example, with five contiguous time slots per frame populated, it has been found that a GPS receiver may attain approximately 30 dB of interference margin, over an entire ATC service area, even when the ATC is radiating at 1558.5 MHz. With four contiguous time slots per frame populated, an additional 10 dB of interference margin may be gained for a total of 40 dB, even when the ATC is radiating at 1558.5 MHz.

There still may be concern about the potential loss in network capacity (especially in data mode) that may be incurred over a frequency interval where embodiments of FIG. 11 are used to underpopulate a frame. Moreover, even though embodiments of FIG. 12 can avoid capacity loss by fully loading a carrier, they may do so subject to the constraint of filling up the frame with both low-power and high-power users. Moreover, if forward link carriers are limited to 5 contiguous high power slots per frame, the maximum forward link data rate per carrier that may be transmitted to a particular user may become proportionately less.

Therefore, in other embodiments, carriers which are subject to contiguous empty/low power slots are not used for the forward link. Instead, they are used for the return link. Consequently, in some embodiments, at least part of the ATC is configured in reverse frequency mode relative to the SBC to thereby maximize a forward link throughput. On a return link, a radiotelephone may be limited to a maximum of 5 slots per frame, which can be adequate for the return link. Whether the five available time slots per frame, on a return link carrier, are assigned to one radiotelephone or to five different radiotelephones, they can be assigned contiguously in these embodiments. As was described in connection with FIG. 12, these five may be used to serve low-power users.

Other embodiments may be based on operating the ATC entirely in reverse frequency mode relative to the SBC. In these embodiments, an ATC transmits over the satellite return link frequencies while radiotelephones respond over the satellite forward link frequencies. If sufficient contiguous spectrum is available to support a broad-band CDMA air interface protocol, such as, for example, the emerging Wideband-CDMA (W-CDMA) 3G standard, the ATC forward link can be based on W-CDMA to increase or maximize data throughput capabilities. Interference to GPS may not be an issue since the ATCs transmit over the satellite return link in these embodiments. Instead, interference may become a concern for the radiotelephones. Based, however, on embodiments of FIGS. 11-12, the radiotelephones can be configured to transmit GSM since ATC return link rates may be lower than those of the forward link. Accordingly, the ATC return link may employ GPRS-based data modes, possibly even EDGE. Thus, return link carriers that are within a predetermined frequency interval from, for example, the GPS band-edge of 1559 MHz, can be under loaded, per embodiments of FIG. 11 or 12, to reduce GPS interference concerns.

Finally, other embodiments may use a partial or total reverse frequency mode and may use a CDMA air interface protocol on both forward and return links. In these embodiments, the ATC forward link to the radiotelephones utilizes the frequencies of the satellite return link (1626.5 MHz to 1660.5 MHz) whereas the ATC return link from the radiotelephones uses the frequencies of the satellite forward link (1525 MHz to 1559 MHz). The ATC forward link(s) may be based on an existing, emerging and/or future CDMA technology (e.g., IS-95, cdma2000, W-CDMA, etc.). The ATC network return link(s) can also be based on an existing, emerging or future CDMA technology. To reduce interference to GPS, in some embodiments, the radiotelephone's output may be gated to cease transmissions for approximately 3 msec once every T msec. In some embodiments, T may be greater than or equal to 6 msec.

This gating may not be needed for ATC return link carriers at approximately 1550 MHz or below. This gating can reduce or minimize an interference potential to GPS receivers in the vicinity of an ATC. To further reduce an interference potential to GPS, the gating of radiotelephones may be substantially synchronized over an ATC service area. A maximum reduction of interference potential to GPS may be derived from a system-wide or area-wide synchronization of the gating. The ATCs can instruct all active radiotelephones regarding the gating epoch. All ATCs can be mutually synchronized via GPS. It will be understood that the above discussion relating to occupancy of (GSM/TDMA) frames, gating of a CDMA waveform and/or band reversal (and various combinations thereof) to reduce or minimize an interference potential to GPS, may also be applied to waveforms and/or protocols other than GSM/TDMA and/or CDMA. Such other protocols may, for example, be Orthogonal Frequency Division Multiplexing (OFDM), Orthogonal Frequency Division Multiple Access (OFDMA) and/or other.

Multi-Band/Multi-Mode Satellite Radiotelephone Communications Systems and Methods Some embodiments of the present invention that were described above may use the same satellite radiotelephone service link band and satellite feeder link band for space-based communications with radiotelephones in all satellite cells of the satellite footprint or service area. Moreover, some embodiments of the present invention that were described above may use the same satellite radio frequency band and substantially the same air interface for terrestrial communications with radiotelephones using an ancillary terrestrial network. Other embodiments of the present invention that will now be described may use more than one band and/or more than one air interface in various satellite cells in the satellite footprint or service area. In still other embodiments, although different bands and/or different air interfaces may be used in different satellite cells or within a satellite cell, the satellite radiotelephone frequency band and the air interface that is used for terrestrial communications between an ancillary terrestrial network and radiotelephones within a given satellite cell, is substantially the same as is used for space-based communications with the radiotelephones within the given satellite cell or in different satellite cells.

As used herein, "substantially the same" band(s) means that two or more bands that are being referenced/compared substantially overlap, but that there may be some areas of non-overlap, for example, at one or more band end. Moreover, "substantially the same" air interface(s) means that two or more air interfaces that are being referenced/compared are similar but need not be identical. Some differences may exist in one air interface relative to another to, for example, account for one or more different characteristic of a propagation channel and/or a different design goal of one system relative to another. Such differences in propagation channel and/or design goal(s) may be found, for example, in comparing propagation channels and/or design goals of terrestrial and satellite environments/systems. For example, a different vocoder rate may be used for a terrestrial system compared to a vocoder rate used for a satellite system (for example, a 13 kbps vocoder may be used for a terrestrial system and 4 kbps vocoder may be used for a satellite system), a forward error correction code and/or an interleaving depth may be different for a terrestrial system compared to values/algorithms used for a satellite system, etc.

Multi-band/multi-mode satellite radiotelephone communications systems and methods according to some embodiments of the present invention may be used, for example, when a satellite footprint or service area spans a geographic area in which two or more terrestrial radiotelephone systems (wireless network operators) are present, to add spaced-based communications capability to two or more terrestrial networks. Within a geographic area that is covered by a given terrestrial radiotelephone system, embodiments of the invention can provide additional capacity and/or extended services/coverage using a space-based component and/or an ancillary terrestrial network, using substantially the same band and/or air interface as the terrestrial radiotelephone system. Thus, different geographic regions corresponding to different terrestrial radiotelephone communications systems and methods according to embodiments of the invention may use different bands and/or air interfaces for compatibility with the terrestrial radiotelephone systems that are located within the different geographic areas. There also may be other scenarios/reasons that make it desirable for a single satellite radiotelephone communications system/method to employ different bands and/or air interfaces over the same and/or different geographic regions thereof.

Figure 16:
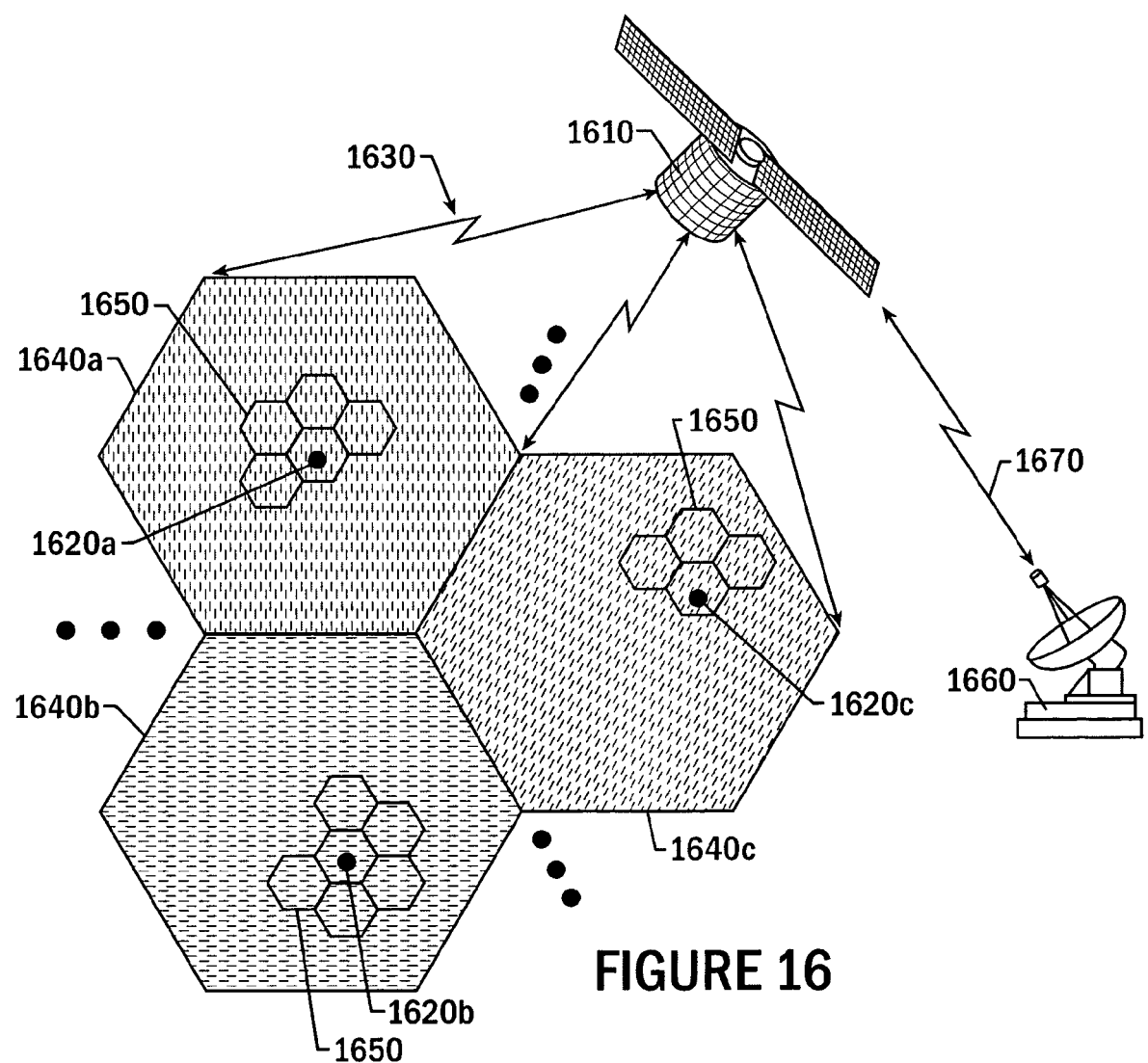
FIG. 16 is a schematic diagram of satellite radiotelephone systems and methods according to some embodiments of the invention.

FIG. 16 is a schematic diagram of satellite radiotelephone systems and methods according to some embodiments of the invention. As shown in FIG. 16, these embodiments of satellite radiotelephone systems and methods include a space-based component 1610 that is configured to communicate with radiotelephones 1620a-1620c in a satellite footprint 1630 that is divided into a plurality of satellite cells 1640a-1640c. It will be understood by those having skill in the art that, although three satellite cells 1640a-1640c and three radiotelephones 1620a-1620c are illustrated in FIG. 16, satellite radiotelephone systems and methods according to embodiments of the present invention may employ more or less than three satellite cells 1640a-1640c and may employ more or less than three radiotelephones 1620a-1620c.

Still referring to FIG. 16, the space-based component 1610 is configured to communicate with a first radiotelephone 1620a in a first satellite cell 1640a over a first frequency band and/or a first air interface, and to communicate with a second radiotelephone 1620b in a second satellite cell 1640b over a second frequency band and/or a second air interface. In other embodiments, the first radiotelephone 1620a and the second radiotelephone 1620b may be in the same satellite cell and the space-based component 1610 may be configured to communicate with a first radiotelephone 1620a in the satellite cell over the first frequency band and/or the first air interface, and to communicate with a second radiotelephone 1620b in the satellite cell over the second frequency band and/or the second air interface.

Still referring to FIG. 16, in some embodiments of the present invention, an ancillary terrestrial network 1650 is configured to communicate terrestrially with the first radiotelephone 1620a over substantially the first frequency band and/or substantially the first air interface, and to communicate terrestrially with the second radiotelephone 1620b over substantially the second frequency band and/or substantially the second air interface. These substantially the same first frequency band and/or first interface in the first satellite cell 1640a and in the portion of the ancillary terrestrial network 1650 therein, is illustrated by the vertical dashed lines that cover the first satellite cell 1640a and the portion of the ancillary terrestrial network 1650 therein. The substantially the same second frequency band and/or second air interface in satellite cell 1640b and in the portion of the ancillary terrestrial network 1650 therein, is illustrated by the horizontal dashed lines that cover the second satellite cell 1640b and the portion of the ancillary terrestrial network 1650 therein.

It will be understood that in FIG. 16, the ancillary terrestrial network 1650 is illustrated as including a small number of ancillary terrestrial network cells for simplicity. However, more or less ancillary terrestrial network cells may be present in some embodiments of the present invention. Moreover, it also will be understood that, in some embodiments, a first portion of the ancillary terrestrial network 1650 within satellite cell 1640a may be operated by a first wireless network operator and a second portion of the ancillary terrestrial network 1650 within the first satellite cell 1640a and/or within the second satellite cell 1640b may be operated by a second wireless network operator. Accordingly, some embodiments of the invention provide systems and methods for adding space-based and/or terrestrial communications capacity to first and second terrestrial networks. In some embodiments, the first and/or second terrestrial networks may be cellular, PCS and/or broadcast (terrestrial and/or satellite) wireless networks. In other embodiments, the first and/or second terrestrial networks may be wireline/cable networks.

Referring again to FIG. 16, satellite radiotelephone systems and methods according to some embodiments of the present invention also include a gateway 1660 that is configured to communicate with the space-based component 1610 over a feeder link 1670. The feeder link 1670 is configured to transport communications between the space-based component 1610 and the gateway 1660. In some embodiments, the feeder link 1670 comprises the first air interface and the second air interface. Finally, it also will be understood that a third satellite cell 1640c, a third radiotelephone 1620c, and a third frequency band and/or air interface is illustrated by oblique dashed lines in satellite cell 1640c. In other embodiments, the third radiotelephone 1620c is in the same cell as the first radiotelephone 1620a and/or the second radiotelephone 1620b.

Figure 17:
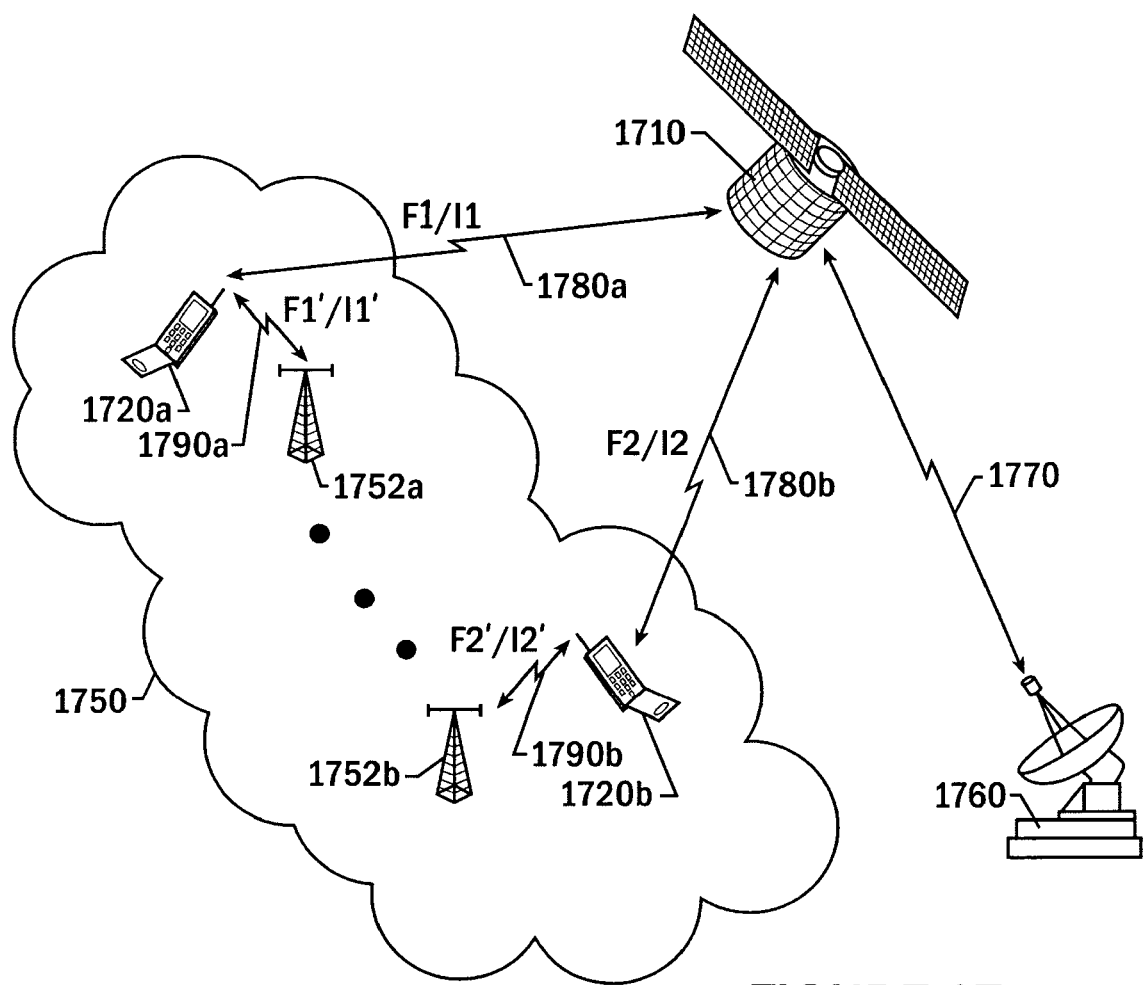
FIG. 17 is a schematic diagram of satellite radiotelephone systems and methods according to some embodiments of the invention.

FIG. 17 is a schematic diagram of satellite radiotelephone systems and methods according to other embodiments of the present invention. As shown in FIG. 17, a space-based component 1710 is configured to communicate with a first radiotelephone 1720a over a first frequency band and/or first air interface 1780a, also designated in FIG. 17 by F1/I1. As also shown in FIG. 17, the space-based component 1710 is also configured to communicate with a second radiotelephone 1720b over a second frequency band and/or a second air interface 1780b, also designated in FIG. 17 by F2/I2. An ancillary terrestrial network 1750 is configured to communicate terrestrially with the first radiotelephone 1720a over substantially the first frequency band and/or substantially the first air interface 1790a, also designated in FIG. 17 as F1'/I1', and to communicate terrestrially with the second radiotelephone 1720b over substantially the second frequency band and/or substantially the second air interface 1790b, also designated in FIG. 17 as F2'/I2'. The ancillary terrestrial network 1750 may be included within a single satellite cell or may spread across multiple satellite cells.

As also shown in FIG. 17, the ancillary terrestrial network can comprise a first ancillary terrestrial component 1752a that is configured to communicate terrestrially with the first radiotelephone 1720a over substantially the first frequency band and/or substantially the first air interface 1790a. A second ancillary terrestrial component 1752b is configured to communicate terrestrially with the second radiotelephone 1720b over substantially the second frequency band and/or substantially the second air interface 1790b. As was the case in FIG. 16, a large number of radiotelephones 1720 and/or ancillary terrestrial components 1752 may be provided in some embodiments. The first and second ancillary terrestrial components 1752a, 1752b, respectively, may be parts of two separate wireless networks in the same and/or different satellite cells, in some embodiments. Thus, some embodiments of FIG. 17 provide systems and methods for adding space-based and/or ancillary terrestrial communications to first and second terrestrial networks. A gateway 1760 and a feeder link 1770 may also be provided, as was described in connection with FIG. 16. It will be understood that the gateways 1660 and 1760 of FIGS. 16 and 17, respectively, may be connected to other networks (not shown).

Some embodiments of the present invention provide satellite radiotelephone systems and/or methods that include radiotelephone links that are operative over a plurality of bands. In some embodiments, the band-sensitive (i.e., frequency-sensitive) components of the space-based component 1610, 1710, such as the antenna feed network, the power amplifiers, the low noise amplifiers, etc., may be designed to be broadband, so that the operational range of the space-based component can extend over a plurality of service link bands, such as L-band, S-band, etc. In other embodiments, separate components for each band may be provided. In still other embodiments, some common broadband components and some separate narrowband components may be provided.

Moreover, other embodiments of the present invention may provide a multi-mode payload, by providing a plurality of air interfaces that may be used to provide radiotelephone communications with the space-based component 1610, 1710 and a plurality of radiotelephones 1620, 1720 in a satellite footprint over the same and/or a plurality of satellite cells. The space-based component 1610, 1710 may be configured to support a plurality of air interface standards/protocols, for example by having a programmable/configurable channel increment that is responsive to ground commands and/or a channel increment that accommodates a plurality of air interface protocols/bandwidths. Different channel increments, for example, may be applied by the space-based components 1620, 1720 to different bands of the received feeder link signal 1670, 1770 from a gateway 1660, 1760. These different bands of the feeder link spectrum may remain constant or may change with time, depending on a traffic carried by each air interface standard that may be supported by the satellite radiotelephone system.

Thus, in some embodiments, the feeder link 1670, 1770 may be segmented into bands, such as bands $B_1$, $B_2$ and $B_3$. In one example, band $B_1$ can transport GSM carriers between a gateway and a space-based component, band $B_2$ can transport narrowband CDMA carriers and band $B_3$ may transport wideband CDMA carriers. It will be understood by those having skill in the art that corresponding return feeder link bands may be provided for carriers from the space-based component 1610, 1710 to the gateway 1660, 1760. In other embodiments of the present invention, an ancillary terrestrial network 1650, 1750 also may be provided to communicate terrestrially with radiotelephones 1620, 1720 in the satellite footprint. Thus, in some embodiments, the ancillary terrestrial network 1650, 1750 may provide a larger portion of the radiotelephone communications traffic in urban/populous areas, whereas the space-based component 1610, 1710 may provide a larger portion of the radiotelephone communications traffic in rural and other sparsely populated areas.

Figure 13:
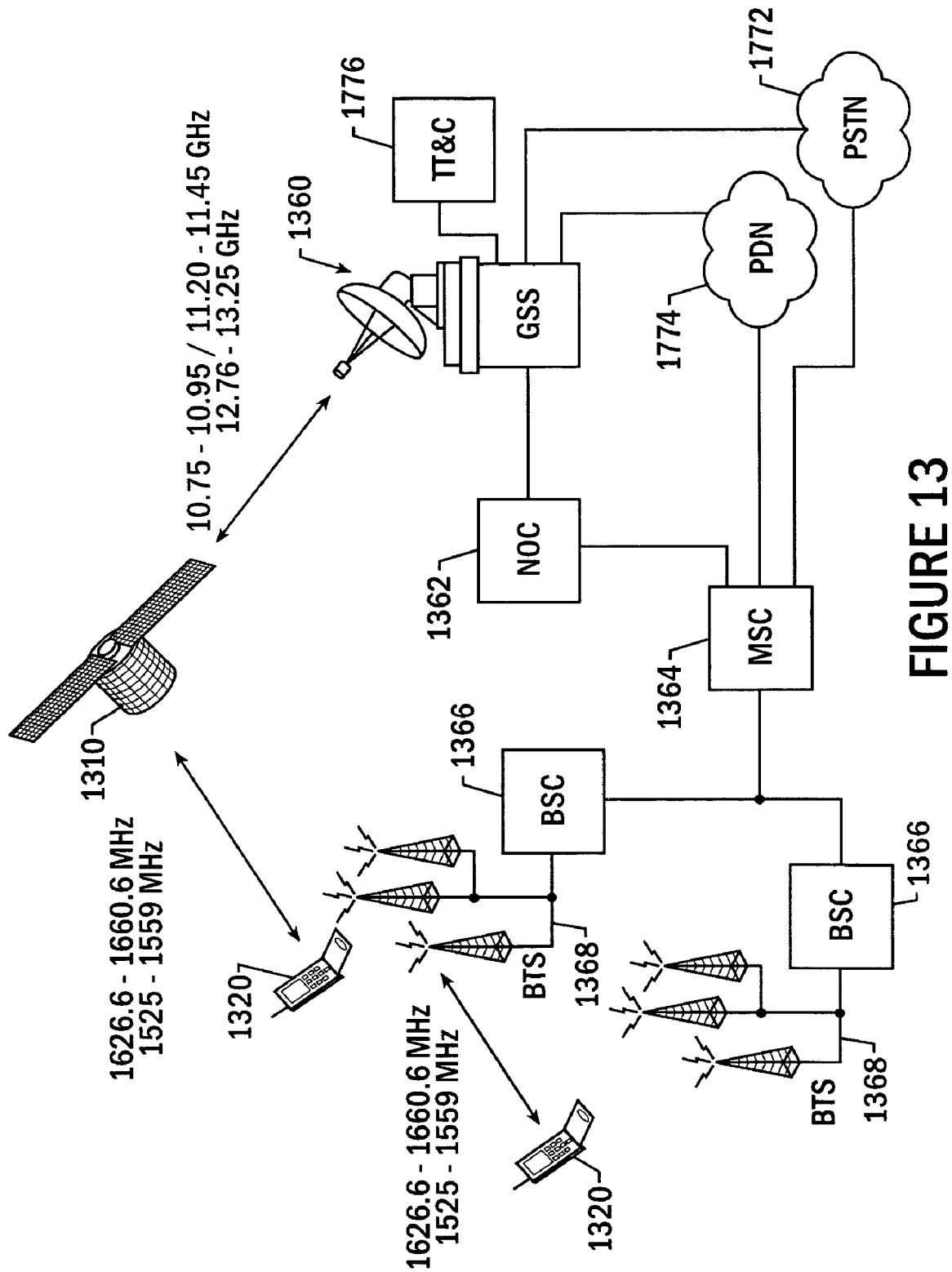
FIG. 13 is a block diagram of satellite radiotelephone systems and methods according to some embodiments of the invention.

FIG. 13 is a block diagram of satellite radiotelephone systems and/or methods that can use multiple bands and/or multiple modes according to some embodiments of the present invention. It will be understood by those having skill in the art that FIG. 13 relates to GSM, and system elements that provide a GSM air interface are shown. However, other satellite radiotelephone systems and/or methods also may be provided according to embodiments of the present invention.

In particular, as shown in FIG. 13, these embodiments of satellite radiotelephone communication systems and methods include a space-based component 1310, for example a geostationary satellite, and at least one Gateway Station Subsystem (GSS) 1360, Network Operations Center (NOC) 1362, Mobile Switching Center (MSC) 1364, Base Station Controller (BSC) 1366 and Base Transceiver Station (BTS) 1368. The satellite radiotelephone system may be connected to the Public Switched Telephone Network (PSTN) 1772 and/or to one or more Public Data Networks (PDN) 1774. In addition, to offer a General Packet Radio Service (GPRS), some MSCs 1364 may be augmented by appropriate packet switching facilities, generally referred to as Support GPRS Service Node (SGSN) and GPRS Gateway Support Node (GGSN). The GSS also may be connected to a Tracking Telemetry & Command (TT&C) system 1776. A plurality of radiotelephones 1320 also may be provided.

Figure 14:
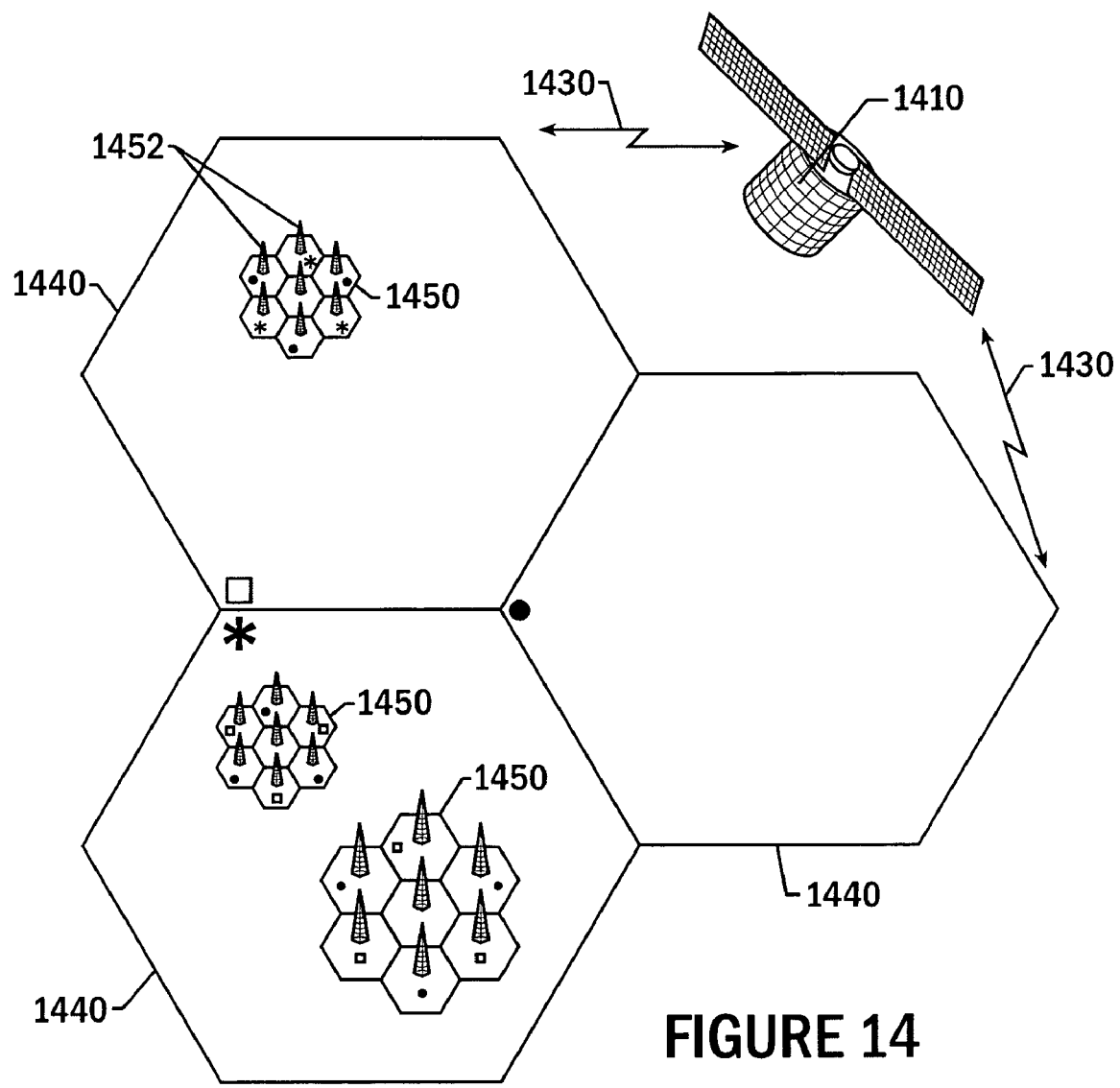
FIG. 14 is a schematic diagram of terrestrial frequency reuse of satellite frequencies according to some embodiments of the invention.

FIG. 14 illustrates frequency reuse between a space-based component and an ancillary terrestrial network according to some embodiments of the present invention. As shown in FIG. 14, relatively small ancillary terrestrial network cells 1450 are nested inside the relatively large satellite cells 1440. This may occur because, even with large antenna reflectors that may be used in the space-based component 1410, the satellite cells 1440 may still be on the order of several hundred kilometers in diameter, whereas the ancillary terrestrial network cells 1450 may be one, two, three or more orders of magnitude smaller than the satellite cells. In FIG. 14, terrestrial reuse of a frequency (or frequencies) of a satellite band of frequencies is indicated by a symbol of a dot, square or asterisk (•, ☐ or *).

Embodiments of the present invention as shown in FIGS. 13 and 14 can allow a single satellite radiotelephone system to support a plurality of ancillary terrestrial components 1452 in an ancillary terrestrial network 1450, with at least some of the ancillary terrestrial components 1452 providing terrestrial communications connectivity via a different air interface. This may allow the relatively large satellite footprint 1430 to be used in a terrestrial market which is segmented. Thus, in some embodiments, the satellite radiotelephone system may be configured to support a GSM-based ancillary terrestrial component/network, a narrowband CDMA-based ancillary terrestrial component/network, a wideband CDMA-based ancillary terrestrial component/network, an OFDM/OFDMA-based ancillary terrestrial component/network and/or other ancillary terrestrial component/network, at the same time and over the same or different satellite cells. In other embodiments, a subset of the ancillary terrestrial components/networks may be operating using frequencies of an L-band of satellite frequencies, for example, while another subset of ancillary terrestrial components/networks may be operating using frequencies of an S-band of satellite frequencies or any other band of frequencies.

As was already described, in some embodiments, satellite radiotelephone communications systems and methods can provide substantially the same band/same air interface service for both space-based communications with the space-based component and terrestrial communications with at least one of its ancillary terrestrial components. This can allow simplified radiotelephones.

Figure 15:
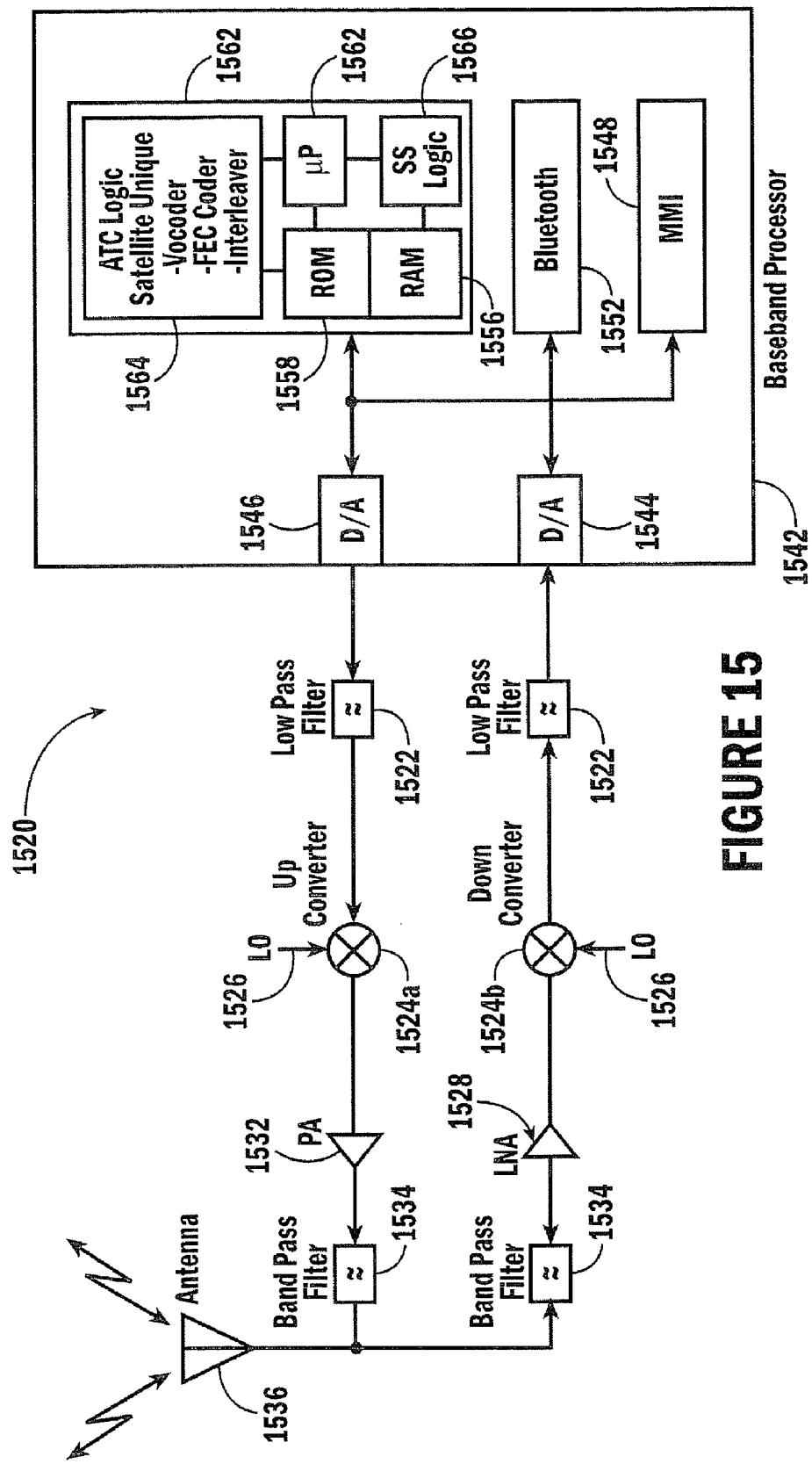
FIG. 15 is a block diagram of radiotelephones according to some embodiments of the invention.

In particular, FIG. 15 is a block diagram of radiotelephones 1520 that may be used to communicate with a space-based component and an ancillary terrestrial component in satellite radiotelephone systems or methods according to some embodiments of the present invention. In some embodiments, these radiotelephones 1520 can be used with satellite radiotelephone systems according to some embodiments of the present invention that include an ancillary terrestrial component and a space-based component that use substantially the same band and substantially the same air interface. The ability to reuse the same spectrum for space-based and terrestrial communications can facilitate low cost, small and/or lightweight radiotelephones, according to some embodiments of the present invention.

Moreover, some embodiments of the present invention can place more of a burden of link performance with a space-based component rather than with a radiotelephone, compared to prior satellite radiotelephone systems, such as Iridium, Thuraya and/or Globalstar. Accordingly, large antennas, a high radiated power level and/or a high Equivalent Isotropic Radiated Power (EIRP) level (compared to a cellular/PCS radiotelephone antenna, radiated power and/or EIRP level) may not need to be used by the radiotelephone. Rather, antennas, power and/or EIRP levels that are substantially the same or similar to those used by conventional cellular/PCS radiotelephones may be used.

Accordingly, referring to FIG. 15, a single Radio Frequency (RF) chain including low pass filters 1522, up and down converters 1524a, 1524b, Local Oscillators (LO) 1526, Low Noise Amplifier (LNA) 1528, Power Amplifier (PA) 1532, bandpass filters 1534 and antenna 1536, may be used. A single baseband processor 1542 may be used, including an analog-to-digital converter (A/D) 1544, a digital-to-analog converter (D/A) 1546 and a Man-Machine Interface (MMI) 1548. An optional Bluetooth interface 1552 may be provided. An Application-Specific Integrated Circuit (ASIC) 1554 may include thereon Random Access Memory (RAM) 1556, Read-Only Memory (ROM) 1558, a microprocessor (μP) 1562, logic for ancillary terrestrial communications (ATC Logic) 1564 and logic for space-based communications (Space Segment Logic or SS Logic) 1566. The SS Logic 1566 can be used to accommodate satellite-unique requirements over and above those of cellular and/or PCS, such as a satellite-unique vocoder, a satellite forward error correction coding scheme, a satellite-unique interlever, etc. However, this added gate count may not substantially increase the cost of the ASIC 1554.

According to other embodiments of the invention, the space-based component may be dimensioned appropriately, so that there is no need for radiotelephones to use large antennas 1536 and/or to have to radiate any more power when in satellite mode than when in terrestrial mode. An appropriate level of link robustness may be attained via the spot-beam gain that can be provided by a larger satellite antenna and/or other techniques. This can more than compensate for the several dB reduction in satellite link robustness that may occur when eliminating a large satellite antenna from the radiotelephone and/or using a single antenna for terrestrial and satellite communications. Accordingly, single mode and single band radiotelephones may be provided that can communicate with the space-based component and the ancillary terrestrial network over a single band and single air interface.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A radiotelephone comprising:
    a single radio frequency chain and a single baseband processor that is connected thereto,
    wherein the single radio frequency chain and the single baseband processor that is connected thereto are configured to communicate with both a space-based system and a terrestrial wireless network using frequencies of a satellite band;
    wherein the single radio frequency chain and the single baseband processor that is connected thereto are further configured to communicate with both the space-based system and the terrestrial wireless network using substantially the same air interface; and
    wherein the substantially the same air interface is a Time Division Multiple Access (TDMA), Code Division Multiple Access (CDMA), Frequency Division Multiple Access (FDMA), Orthogonal Frequency Division Multiplexed (OFDM), Orthogonal Frequency Division Multiple Access (OFDMA), Frequency Division Duplex (FDD) and/or Time Division Duplex (TDD) air interface.

2. A radiotelephone according to claim 1 wherein the single radio frequency chain comprises:
    a common antenna that is configured to communicate with both the space-based system and the terrestrial wireless network using the frequencies of the satellite band and using the substantially the same air interface;
    a common transmit chain that is configured to transmit communications from the baseband processor to the space-based system and from the terrestrial wireless network via the common antenna using the frequencies of the satellite band and the substantially the same air interface; and
    a common receive chain that is configured to receive communications for the baseband processor from the space-based system and from the terrestrial wireless network via the common antenna using the frequencies of the satellite band and the substantially the same air interface.

3. A radiotelephone according to claim 2 wherein the common transmit chain comprises:
    a common up converter that is responsive to the baseband processor; and
    a common power amplifier that is responsive to the common up converter;
    wherein the common antenna is responsive to the common power amplifier.

4. A radiotelephone according to claim 3 further comprising:
    a common low pass filter connected between the baseband processor and the common up converter; and
    a common band pass filter connected between the common power amplifier and the common antenna.

5. A radiotelephone according to claim 3 wherein the common power amplifier and the common antenna are configured to radiate no more maximum power when transmitting to the space-based system than when transmitting to the terrestrial wireless network.

6. A radiotelephone according to claim 2 wherein the common receive chain comprises:
    a common low noise amplifier that is responsive to the common antenna; and
    a common down converter that is responsive to the common low noise amplifier;
    wherein the baseband processor is responsive to the common down converter.

7. A radiotelephone according to claim 6 further comprising:
    a common band pass filter connected between the common antenna and the common down converter; and
    a common low pass filter connected between the common down converter and the baseband processor.

8. A radiotelephone according to claim 2 wherein the common antenna is of a size that is similar to a conventional cellular/PCS radiotelephone antenna.

9. A radiotelephone according to claim 2 wherein the common antenna is smaller than an antenna of a Globalstar or Iridium radiotelephone.

10. A radiotelephone according to claim 1 wherein the baseband processor comprises:
    a satellite unique vocoder, a satellite unique forward error correction coder and/or a satellite unique interleaver.

11. A radiotelephone according to claim 1 wherein the baseband processor comprises:
    a common logic and memory section;
    a first logic section that is configured to provide terrestrial wireless network communication functionality; and
    a second logic section that is configured to provide space-based system communication functionality.

12. A radiotelephone according to claim 1 wherein the satellite band comprises a satellite S-band and/or a satellite L-band.

13. A radiotelephone according to claim 1 in combination with the space-based system and the terrestrial wireless network.

14. A radiotelephone according to claim 1 wherein the single radio frequency chain and the single baseband processor that is connected thereto are configured to communicate with both the space-based system and the terrestrial wireless network using the frequencies of the satellite band and the substantially the same air interface in a common geographic area.

15. A radiotelephone according to claim 1 wherein the single radio frequency chain and the single baseband processor that is connected thereto are also configured to communicate with an ad hoc short range wireless network.

16. A radiotelephone operating method comprising:
    communicating with both a space-based system and a terrestrial wireless network using frequencies of a satellite band via a single radio frequency chain and a single baseband processor that is connected thereto, and communicating with both the space-based system and the terrestrial wireless network using substantially the same air interface via the single radio frequency chain and the single baseband processor that is connected thereto;
    wherein the substantially the same air interface is a Time Division Multiple Access (TDMA), Code Division Multiple Access (CDMA), Frequency Division Multiple Access (FDMA). Orthogonal Frequency Division Multiplexed (OFDM), Orthogonal Frequency Division Multiple Access (OFDMA), Frequency Division Duplex (FDD) and/or Time Division Duplex (TDD) air interface.

17. A method according to claim 16 wherein the single radio frequency chain comprises:
a common antenna that is configured to communicate with both the space-based system and the terrestrial wireless system using the frequencies of the satellite band and using the substantially the same air interface;
a common transmit chain that is configured to transmit communications from the baseband processor to the space-based system and the terrestrial wireless network via the common antenna using the frequencies of the satellite band and the substantially the same air interface; and
a common receive chain that is configured to receive communications for the baseband processor from the space-based system and from the terrestrial wireless network via the common antenna using the frequencies of the satellite band and the substantially the same air interface.

18. A method according to claim 17 wherein the common transmit chain comprises:
a common up converter that is responsive to the baseband processor; and
a common power amplifier that is responsive to the common up converter;
wherein the common antenna is responsive to the common power amplifier.

19. A method according to claim 18 further comprising:
a common low pass filter connected between the baseband processor and the common up converter; and
a common band pass filter connected between the common power amplifier and the common antenna.

20. A method according to claim 18 wherein the common power amplifier and the common antenna are configured to radiate no more maximum power when transmitting to the space-based system than when transmitting to the terrestrial wireless network.

21. A method according to claim 17 wherein the common receive chain comprises:
a common low noise amplifier that is responsive to the common antenna; and
a common down converter that is responsive to the common low noise amplifier;
wherein the baseband processor is responsive to the common down converter.

22. A method according to claim 21 further comprising:
a common band pass filter connected between the common antenna and the common down converter; and
a common low pass filter connected between the common down converter and the baseband processor.

23. A method according to claim 17 wherein the common antenna is of a size that is similar to a conventional cellular/PCS radiotelephone antenna.

24. A method according to claim 17 wherein the common antenna is smaller than an antenna of a Globalstar or Iridium radiotelephone.

25. A method according to claim 16 wherein the baseband processor comprises:
a satellite unique vocoder, a satellite unique forward error correction coder and/or a satellite unique interleaver.

26. A method according to claim 16 wherein the baseband processor comprises:
a common logic and memory section;
a first logic section that is configured to provide terrestrial wireless network communication functionality; and
a second logic section that is configured to provide space-based system functionality.

27. A method according to claim 16 wherein the satellite band comprises a satellite S-band and/or a satellite L-band.

28. A method according to claim 16 wherein the single radio frequency chain and the single baseband processor that is connected thereto are configured to communicate with the space-based system and the terrestrial wireless network using frequencies of the satellite band and the substantially the same air interface in a common geographic area.

29. A method according to claim 16 further comprising communicating with an ad hoc short range wireless network via the single radio frequency chain and the single baseband processor that is connected thereto.

* * * * *